United States Patent
Anzai et al.

(10) Patent No.: US 11,702,344 B2
(45) Date of Patent: Jul. 18, 2023

(54) METHOD OF PRODUCING POROUS CARBON, AND ELECTRODE AND CATALYST CARRIER CONTAINING POROUS CARBON PRODUCED BY THE METHOD

(71) Applicant: TOYO TANSO CO., LTD., Osaka (JP)

(72) Inventors: Mizuho Anzai, Osaka (JP); Takahiro Morishita, Osaka (JP); Yoshio Shodai, Osaka (JP)

(73) Assignee: TOYO TANSO CO., LTD., Osaka (JP)

( * ) Notice: Subject to any disclaimer, the term of this patent is extended or adjusted under 35 U.S.C. 154(b) by 0 days.

(21) Appl. No.: 17/551,365

(22) Filed: Dec. 15, 2021

(65) Prior Publication Data

US 2022/0127147 A1    Apr. 28, 2022

Related U.S. Application Data

(63) Continuation of application No. 17/255,768, filed as application No. PCT/JP2019/026199 on Jul. 1, 2019, now Pat. No. 11,235,978.

(30) Foreign Application Priority Data

Jun. 29, 2018  (JP) ................................. 2018-125618

(51) Int. Cl.
  *C01B 32/318*   (2017.01)
  *C01B 32/354*   (2017.01)
  *B01J 20/20*    (2006.01)
  *B01J 35/10*    (2006.01)
  *H01M 4/583*    (2010.01)

(52) U.S. Cl.
  CPC ............ *C01B 32/318* (2017.08); *B01J 20/20* (2013.01); *B01J 35/1019* (2013.01); *B01J 35/1023* (2013.01); *B01J 35/1028* (2013.01); *B01J 35/1038* (2013.01); *B01J 35/1042* (2013.01); *B01J 35/1047* (2013.01); *B01J 35/1061* (2013.01); *B01J 35/1066* (2013.01); *C01B 32/354* (2017.08); *H01M 4/583* (2013.01); *C01P 2006/12* (2013.01); *C01P 2006/14* (2013.01); *C01P 2006/16* (2013.01)

(58) Field of Classification Search
  CPC ........ B01J 21/18; B01J 20/20; B01J 35/1019; B01J 35/1023; B01J 35/1028; B01J 35/1038; B01J 35/1042; B01J 35/1047; B01J 35/1061; B01J 35/1066; C01B 32/318; C01B 32/354; C01P 2006/12; C01P 2006/14; C01P 2006/16
  USPC ................... 502/101, 180; 423/445 R, 447.8
  See application file for complete search history.

(56) References Cited

U.S. PATENT DOCUMENTS

| | | | |
|---|---|---|---|
| 6,812,187 | B1 | 11/2004 | Pak et al. |
| 7,718,155 | B2 | 5/2010 | Zhang et al. |
| 7,718,156 | B2 | 5/2010 | Zhang et al. |
| 8,648,009 | B2 | 2/2014 | Foley et al. |
| 2003/0108785 | A1 | 6/2003 | Wu et al. |
| 2006/0166811 | A1 | 7/2006 | Huang et al. |
| 2006/0194097 | A1 | 8/2006 | Kim et al. |
| 2009/0304570 | A1 | 12/2009 | Kim et al. |
| 2010/0125035 | A1 | 5/2010 | Zhang et al. |
| 2012/0077670 | A1 | 3/2012 | Morishita et al. |
| 2013/0236816 | A1 | 9/2013 | Jung et al. |
| 2013/0330504 | A1 | 12/2013 | Morishita et al. |
| 2015/0030525 | A1 | 1/2015 | Mitra |
| 2016/0355402 | A1 | 12/2016 | Mitra |
| 2017/0021330 | A1 | 1/2017 | Morishita et al. |
| 2020/0028195 | A1 | 1/2020 | Shitanda et al. |

FOREIGN PATENT DOCUMENTS

| | | | | |
|---|---|---|---|---|
| CN | 104817067 A | | 8/2015 | |
| CN | 105692580 A | | 6/2016 | |
| EP | 3034484 A1 | | 6/2016 | |
| JP | 2009-514762 A | | 4/2009 | |
| JP | 2015076125 A | * | 4/2015 | ............ Y02E 60/10 |
| JP | 2015-164889 | | 9/2015 | |

(Continued)

OTHER PUBLICATIONS

PCT International Preliminary Report on Patentability (Form PCT/IB/373) filed in PCTJP2019/026199 with PCT Written Opinion of the International Searching Authority (Form PCT/ISA/237) dated Sep. 3, 2019.

(Continued)

*Primary Examiner* — Patricia L. Hailey
(74) *Attorney, Agent, or Firm* — Rankin, Hill & Clark LLP

(57) ABSTRACT

A method of producing a porous carbon is provided that can change type of functional groups, amount of functional groups, or ratio of functional groups while inhibiting its pore structure from changing. A method of producing a porous carbon includes: a first step of carbonizing a material containing a carbon source and a template source, to prepare a carbonized product; and a second step of immersing the carbonized product into a template removing solution, to remove a template from the carbonized product, and the method is characterized by changing at least two or more of the following conditions: type of the material, ratio of the carbon source and the template source, size of the template, and type of the template removal solution, to thereby control type, amount, or ratio of functional groups that are present in the porous carbon.

8 Claims, 21 Drawing Sheets

(56) References Cited

FOREIGN PATENT DOCUMENTS

| JP | 2017-208444 A | 11/2017 |
| JP | 2018-39719 A | 3/2018 |
| JP | 2018-75506 A | 5/2018 |
| WO | 2007/044614 A2 | 4/2007 |
| WO | 2008/053919 A1 | 5/2008 |
| WO | 2018/067292 A1 | 4/2018 |

OTHER PUBLICATIONS

Chinese Office Action (CNOA) dated Aug. 5, 2020 for the corresponding Chinese Patent Application No. 201980005628.1.

Japanese Office Action dated Dec. 23, 2019 issued in the corresponding Japanese Patent Application No. 2019-556390 and its English machine translation.

Extended European Search Report (EESR) dated Jul. 30, 2021 for the corresponding European Patent Application No. 19826921.9.

Shiraishi et al., "Influence of heating duration on high-voltage charging durability of an activated carbon electrode for electric double layer capacitors", TANSO vol. 2009, No. 240, pp. 226-229, 2009 and its partial English machine translation; Cited in a third party submission dated Jan. 12, 2023 for JP2020-043418.

Takagi., "Analysis of surface structure of carbon materials by using temperature-programmed desorption method", TANSO vol. 2009, No. 237, pp. 67-71, 2009 and its partial English machine translation; Cited in a third party submission dated Jan. 12, 2023 for JP2020-043418.

Ruiz et al., "Effects of thermal treatment of activated carbon on the electrochemical behaviour in supercapacitors", ScienceDirect, Electrochimica Acta vol. 52, 2007, pp. 4969-4973; Cited in a third party submission dated Jan. 12, 2023 for JP2020-043418.

Yamashita et al., "Modification of Functional Group on Porous Carbon Materials and Its Characteristics—Effect on Capacitance -", Journal of the Surface Science Society of Japan vol. 27, No. 8, pp. 461-468, 2006 and its partial English machine translation; Cited in a third party submission dated Jan. 12, 2023 for JP2020-043418.

Shiraishi et al., Electric Double-Layer Capacitance of Meso/Macroporous Activated Carbon Fibers Prepared by the Blending Method, Journal of the Electrochemical Society, 149 (7) A855-A861, 2002; Cited in a third party submission dated Jan. 12, 2023 for JP2020-043418.

Korean Office Action (KROA) dated Sep. 15, 2022 for Korean Patent Application No. 10-2021-7002818; English machine translation.

Third Party Submission submitted to the JPO in Japanese Patent Application No. 2020-043418 dated Jan. 12, 2023.

Korean Office Action (KROA) dated Jan. 17, 2023 issued in Korean Patent Application No. 10-2021-7002818 and its English machine translation.

\* cited by examiner

METHOD OF PRODUCING POROUS CARBON, AND ELECTRODE AND CATALYST CARRIER CONTAINING POROUS CARBON PRODUCED BY THE METHOD

TECHNICAL FIELD

The present invention relates to a method of producing a porous carbon and to an electrode and a catalyst support containing a porous carbon produced by the method.

BACKGROUND ART

Activated carbon, which is one type of porous carbon, is often used as an adsorbent, a catalyst support for fuel cells, and the like. It has been known that this activated carbon may be fabricated by a method in which a source material is heated and carbonized under a non-oxidizing atmosphere. Examples of the source material include: plant-originating source materials such as lignin, cellulosic substances including wood pulp, saw dust, coconut husk, cottonseed hull, and chaff, starchy substances including foxtail millet, Japanese barnyard millet, and corn; mineral-originating source materials such as coal, tar, and petroleum pitch; and synthetic resins such as phenolic resin and polyacrylonitrile. The method of treating the carbonized substances of these source materials with a chemical agent to activate the carbonized substances is also well known.

Here, when the activated carbon is used as a catalyst support or the like of a battery, the amount of functional groups may often be different from a desired amount. When this is the case, the amount of functional groups can be changed by heat-treating the activated carbon. (See Patent Literature 1 below)

CITATION LIST

Patent Literature

[Patent Literature 1] JP 2018-075506 A

SUMMARY OF INVENTION

Technical Problem

However, when activated carbon is heat-treated as described in Patent Literature 1 above, the pores are likely to collapse, resulting in a change in the pore structure. Consequently, the desired object cannot be accomplished.

Accordingly, it is an object of the present invention to provide a method of producing a porous carbon and so forth that makes it possible to change type of functional group, amount of functional group, or the ratio of functional groups while inhibiting the pore structure from changing.

Solution to Problem

In order to accomplish the foregoing and other objects, the present invention provides a method of producing a porous carbon including: a first step of carbonizing a material containing a carbon source and a template source, to prepare a carbonized product; and a second step of immersing the carbonized product into a template removing solution, to remove a template from the carbonized product, and the method is characterized by changing at least two or more of the following conditions: type of the material, ratio of the carbon source and the template source, size of the template, and type of the template removal solution, to thereby control type, amount, or ratio of functional groups that are present in the porous carbon.

Advantageous Effects of Invention

The present invention achieves the significant advantageous effect of making it possible to change type of functional groups, amount of functional groups, and ratio of functional groups while inhibiting the pore structure from changing.

DESCRIPTION OF EMBODIMENTS

Figure 1:
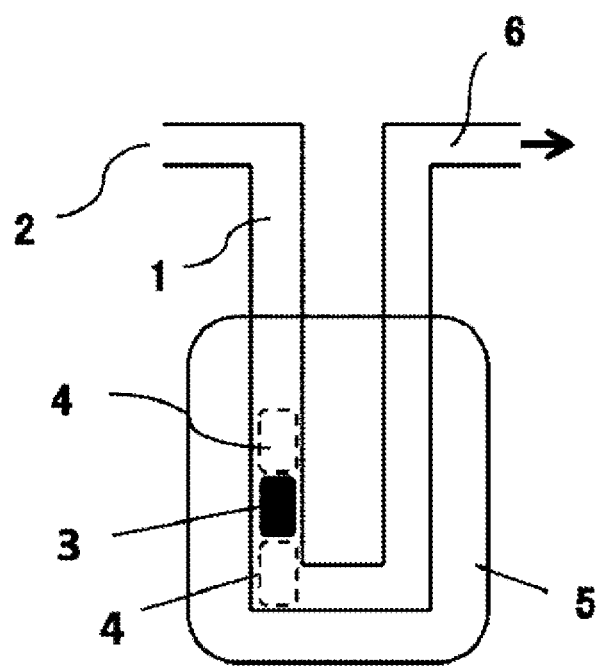
FIG. 1 is an illustrative view of a measurement device used for measuring CO amount and $CO_2$ amount using a TPD method or measuring edge amount using the TPO method.

In one embodiment, the present invention provides a method of producing a porous carbon including: a first step of carbonizing a material containing a carbon source and a template source, to prepare a carbonized product and a second step of immersing the carbonized product into a template removing solution, to remove a template from the carbonized product, the method characterized by changing at least two or more of the following conditions: type of the material, ratio of the carbon source and the template source, size of the template, and type of the template removal solution, to thereby control type, amount, or ratio of functional groups that are present in the porous carbon.

The just-mentioned embodiment can change type of functional groups, amount of functional groups, or ratio of functional groups while inhibiting a change in the pore structure (a structure having a large number of mesopores such that micropores are formed at positions facing the mesopores in the carbonaceous wall constituting the outer wall of the mesopores, and a structure such that the mesopores are open pores and the hollow portions thereof are connected to each other). Moreover, because the amount, etc., of the functional groups can be changed without performing a heat treatment, the manufacturing cost of the porous carbon is reduced. In addition, the type, etc., of the functional groups can be changed by the conditions such as the mixing ratio of the carbon source and the template source. Therefore, when the porous carbon is produced while changing two or more of the conditions, the freedom in the manufacture is improved. For example, when the conditions of the mixing ratio of the carbon source and the template source and the type of the organic resin are selected in producing the porous carbon, the type, etc., of the functional groups can be made equivalent both when the proportion of the carbon source is made smaller in the mixing ratio of the carbon source and the template source and hydrochloric acid is used as the template removing solution and when the proportion of the template source is made smaller in the mixing ratio of the carbon source and the template source and sulfuric acid is used as the template removing solution.

Note that, in the present description, the term "template" refers to a substance that can be removed by a template removing solution from a carbonized product prepared by carbonizing a material containing a carbon source and a template source.

The term "template source" refers to a material that serves as the template, including: a material from which the template is formed by carbonizing a portion thereof, such as a metal organic acid; a material from which the template is formed by eliminating a portion of the resin by carbonizing; and a template itself, such as a metal oxide.

The term "template size" refers to the size of the template, which is a crystallite size calculated using the Scherrer equation from the peak half-width of the data obtained by an X-ray diffraction measurement.

Further, the term "material containing a carbon source and a template source" refers to a metal organic acid or a mixture of an organic resin and a template.

Also in the present description, pores having a pore diameter of less than 2 nm are referred to as "micropores," pores having a pore diameter of from 2 nm to 50 nm are referred to as "mesopores," and pores having a pore diameter of greater than 50 nm are referred to as "macropores."

In another embodiment, the present invention may provide a method of producing a porous carbon including: a first step of carbonizing a metal organic acid or a mixture of an organic resin and a template, to prepare a carbonized product; and a second step of immersing the carbonized product into a template removing solution, to remove the template from the carbonized product, the method characterized by changing at least two or more of the following conditions: mixing ratio of the organic resin and the template, size of the template, and type of the template removal solution, to thereby control type, amount, or ratio of functional groups that are present in the porous carbon.

Such an embodiment can also obtain similar advantageous effects to those described above. It should be noted that the type of functional groups, the amount of functional groups, or the ratio of functional groups may be adjusted also by changing the type or the like of the organic resin.

In another embodiment, the present invention may provide a method of producing a porous carbon including: a first step of carbonizing a material containing a carbon source and a template source, to prepare a carbonized product; a second step of immersing the carbonized product into a template removing solution, to remove a template from the carbonized product; and a third step of heat treating the carbonized product from which the template has been removed, the method characterized by: changing at least two or more of the following conditions: type of the material, ratio of the carbon source and the template source, size of the template, type of the template removal solution, and temperature or time of the heat treatment, to thereby control type, amount, or ratio of functional groups that are present in the porous carbon.

The just-described embodiment makes it possible to inhibit the pore structure of the porous carbon from changing even when the heat treatment is performed. Therefore, it is possible to change type of functional groups, amount of functional groups, and ratio of functional groups more greatly while inhibiting the pore structure from changing. In addition, for the same reasons as already discussed above, the freedom in manufacturing the porous carbon is also improved.

It should be noted that when the temperature exceeds 1000° C. in the heat treatment, the porous carbon may be graphitized, so the structure of the porous carbon may change. For this reason, it is desirable that the temperature in the heat treatment be less than or equal to 1000° C.

In another embodiment, the present invention may provide a method of producing a porous carbon including: a first step of carbonizing a metal organic acid or a mixture of an organic resin and a template, to prepare a carbonized product; a second step of immersing the carbonized product into a template removing solution, to remove the template from the carbonized product; and a third step of heat-treating the carbonized product from which the template has been removed, the method characterized by changing at least two or more of the following conditions: mixing ratio of the organic resin and the template, size of the template, type of the template removal solution, and temperature or time of the heat treatment, to thereby control type, amount, or ratio of functional groups that are present in the porous carbon.

Such an embodiment can also obtain similar advantageous effects to those described above.

In another embodiment, the present invention may provide a method of producing a porous carbon including: a first step of carbonizing a material containing a carbon source and a template source, to prepare a carbonized product; and a second step of immersing the carbonized product in a template removing solution, to remove a template from the carbonized product; wherein micropores are formed at positions facing mesopores, the method characterized by changing at least two or more of the following conditions: type of the material, ratio of the carbon source and the template source, and type of the template removal solution, to thereby control type, amount, or ratio of functional groups, wherein the volume of the micropores is greater than or equal to 0.2 mL/g.

In another embodiment, the present invention may provide a method of producing a porous carbon including: a first step of carbonizing a material containing a carbon source and a template source, to prepare a carbonized product; a second step of immersing the carbonized product into a template removal solution, to remove a template from the carbonized product; and a third step of heat treating the carbonized product from which the template has been removed; wherein micropores are formed at positions facing mesopores, the method characterized by changing at least two or more of the following conditions: type of the material, ratio of the carbon source and the template source, type of the template removal solution, and temperature or time of the heat treatment, to thereby control type, amount, or ratio of functional groups, wherein the volume of the micropores is greater than or equal to 0.2 mL/g.

The just-described embodiment of the present invention makes it possible to control the type, amount, and ratio of the functional groups to desired values while inhibiting a change in the micropore volume.

It is preferable that the micropore volume be greater than or equal to 0.25 mL/g, more preferably greater than or equal to 0.3 mL/g, and still more preferably greater than or equal to 0.35 mL/g.

In another embodiment, the present invention may provide a method of producing a porous carbon including: a first step of carbonizing a material containing a carbon source and a template source, to prepare a carbonized product; and a second step of immersing the carbonized product into a template removing solution, to remove a template from the carbonized product, the method characterized by changing a size of the template, to thereby control type, amount, or ratio of functional groups that are present in the porous carbon.

In another embodiment, the present invention may provide a method of producing a porous carbon including: a first step of carbonizing a metal organic acid or a mixture of an organic resin and a template, to prepare a carbonized product; and a second step of immersing the carbonized product into a template removing solution, to remove the template from the carbonized product, the method characterized by changing a size of the template, to thereby control type, amount, or ratio of functional groups that are present in the porous carbon.

In another embodiment, the present invention may provide a method of producing a porous carbon including: a first step of carbonizing a material containing a carbon source and a template source, to prepare a carbonized product; a second step of immersing the carbonized product into a template removal solution, to remove a template from the carbonized product; and a third step of heat treating the carbonized product from which the template has been removed, the method characterized by: changing a size of the template, to thereby control type, amount, or ratio of functional groups that are present in the porous carbon.

In another embodiment, the present invention may provide a method of producing a porous carbon including: a first step of carbonizing a metal organic acid or a mixture of an organic resin and a template, to prepare a carbonized product; a second step of immersing the carbonized product into a template removing solution, to remove the template from the carbonized product; and a third step of heat-treating the carbonized product from which the template has been removed, the method characterized by changing a size of the template, to thereby control type, amount, or ratio of functional groups that are present in the porous carbon.

As in the four embodiments that have been just described above, the edge amount can be changed merely by changing the template size, and by changing the edge amount, the type of the functional groups, the amount of the functional groups, and the ratio of the functional groups can be changed. As a result, it is possible to easily produce porous carbons that are different in the type and so forth of the functional groups.

It is also possible that the porous carbon produced by the above-described methods may be used as an electrode or a catalyst support.

Not just for these applications, the porous carbon produced by an embodiment of the invention may also be used for an adsorbent or the like.

Herein, examples of the metal organic acid include magnesium citrate, magnesium oxalate, calcium citrate, and calcium oxalate. The metal organic acid may be a hydrate or an anhydride thereof.

Examples of the above-mentioned template include an oxide of an alkaline-earth metal. Examples of the alkaline-earth metal include magnesium, calcium, strontium, and barium. Preferable among these examples are magnesium and calcium, and particularly preferable is magnesium.

Examples of the above-mentioned organic resin include various organic polymers, thermoplastic resins, and thermosetting resins. Specific examples include: various synthetic resins and polymers such as polyvinyl alcohol, aliphatic or aromatic polyester resins, polyolefin resins, acrylic resins, styrene resins, polyamide resins, polyacrylonitrile resins, and elastomers mainly composed of polybutadiene, polyisoprene, or the like; thermoplastic resins and polymers such as natural rubber and petroleum resins; and thermosetting resins such as phenolic resins, furan resins, epoxy resins, and alkyd resins.

For the cleaning solution for removing the template (i.e., the template removing solution), it is preferable to use a dilute acid of 2 mol/L or lower of a common inorganic acid, such as hydrochloric acid, sulfuric acid, nitric acid, and acetic acid. It is also possible to use hot water of 80° C. or higher.

EXAMPLES

Example 1

First, trimagnesium dicitrate nonahydrate [$Mg_3(C_6H_5O_7)_2$], which serves as both a carbon source and a template source, was prepared, and this was carbonized in a nitrogen gas atmosphere at 900° C. for 1 hour. Thereby, a carbonized substance having a template, MgO, and a carbonaceous wall was obtained. Next, the resultant carbonized substance was washed with a sulfuric acid solution added at a concentration of 1 mol/L, to dissolve the MgO away completely, whereby a porous carbon having a multiplicity of mesopores and a multiplicity of micropores was obtained.

The porous carbon prepared in this manner is hereinafter referred to as carbon A1.

Example 2

The above-described carbon A1 was heat-treated under a nitrogen gas atmosphere at 400° C. for 1 hour.

The porous carbon prepared in this manner is hereinafter referred to as carbon A2.

Example 3

The above-describe carbon A1 was heat-treated under a nitrogen gas atmosphere at 700° C. for 1 hour.

The porous carbon prepared in this manner is hereinafter referred to as carbon A3.

Example 4

The above-described carbon A1 was heat-treated under a nitrogen gas atmosphere at 1000° C. for 1 hour.

The porous carbon prepared in this manner is hereinafter referred to as carbon A4.

Example 5

A 5:5 weight ratio mixture of PVA (polyvinyl alcohol) serving as the carbon source and MgO particles having a template size of 10 nm was carbonized under the same conditions as described in Example 1 above, and then, MgO was dissolved away.

The porous carbon prepared in this manner is hereinafter referred to as carbon A5.

Example 6

A porous carbon was prepared in the same manner as described in Example 5 above, except that MgO particles having a template size of 30 nm were used as the MgO particles.

The porous carbon prepared in this manner is hereinafter referred to as carbon A6.

Example 7

A porous carbon was prepared in the same manner as described in Example 5 above, except that MgO particles having a template size of 150 nm were used as the MgO particles.

The porous carbon prepared in this manner is hereinafter referred to as carbon A7.

Example 8

The above-described carbon A5 was heat-treated under a nitrogen gas atmosphere at 700° C. for 1 hour.

The porous carbon prepared in this manner is hereinafter referred to as carbon A5.

Example 9

The above-described carbon A5 was heat-treated under a nitrogen gas atmosphere at 400° C. for 1 hour.

The porous carbon prepared in this manner is hereinafter referred to as carbon A9.

Example 10

The above-described carbon A5 was heat-treated under a nitrogen gas atmosphere at 1000° C., for 1 hour.

The porous carbon prepared in this manner is hereinafter referred to as carbon A10.

Example 11

A porous carbon was prepared in the same manner as described in Example 5 above, except that hydrochloric acid was used as the cleaning solution (i.e., template removing solution).

The porous carbon prepared in this manner is hereinafter referred to as carbon A11.

Example 12

A porous carbon was prepared in the same manner as described in Example 5 above, except that nitric acid was used as the cleaning solution.

The porous carbon prepared in this manner is hereinafter referred to as carbon A12.

Example 13

A porous carbon was prepared in the same manner as described in Example 5 above, except that PVA and MgO particles were mixed in a weight ratio of 3:7.

The porous carbon prepared in this manner is hereinafter referred to as carbon A13.

Example 14

A porous carbon was prepared in the same manner as described in Example 5 above, except that phenolic resin was used as the carbon source and that the phenolic resin and MgO particles were mixed in a weight ratio of 3:7.

The porous carbon prepared in this manner is hereinafter referred to as carbon A14.

Example 15

A porous carbon was prepared in the same manner as described in Example 5 above, except that phenolic resin was used as the carbon source and that the phenolic resin and MgO particles were mixed in a weight ratio of 4:6.

The porous carbon prepared in this manner is hereinafter referred to as carbon A15.

Example 16

A porous carbon was prepared in the same manner as described in Example 5 above, except that phenolic resin was used as the carbon source and that MgO particles having a template size of 30 nm were used.

The porous carbon prepared in this manner is hereinafter referred to as carbon A16.

Experiment 1

The pore diameter, the BET specific surface area, the total pore volume, the micropore volume, and the mesopore volume of the carbons A1 to A16, the CO amount and the $CO_2$ amount of the carbons A1 to A8 and A11 to A16, and the mean particle size ($D_{50}$) of the carbons A1 to A5 and A13 to A16 were determined by the following methods. The results are shown in Tables 1 and 2. Each of the carbons A1 to A16 had a structure such that micropore are formed at positions facing mesopores in the carbonaceous wall that forms the outer wall of the mesopores, the mesopores are open pores the hollow portions of which are connected to each other.

Pore Diameter

The pore diameter was calculated from an adsorption isotherm using nitrogen gas at 77 K, using BJH (Barrett-Joyner-Halenda) technique. For the carbon A7, the pore diameter of the pores was determined by SEM.

BET Specific Surface Area

Each of the samples was caused to adsorb nitrogen gas with a relative pressure at a temperature of 77 K, and an adsorption isotherm was obtained, to calculate the BET specific surface area by the BET method.

Total Pore Volume

The total pore volume was calculated from the adsorption amount at a relative pressure ($P/P_0$) of 0.95 in the adsorption isotherm using nitrogen gas at 77 K.

Micropore Volume

The micropore volume was obtained using the DA (Dubinin-Astakhov) method.

Mesopore Volume

The mesopore volume was obtained by subtracting the micropore volume from the total pore volume.

$CO$ Amount and $CO_2$ Amount

The CO amount and the $CO_2$ amount were measured with the apparatus shown in FIG. 1 using the TPD (Temperature Programmed Desorption) method. Specifically, the details are as follows.

First a sample 3 (the amount of the sample being 100 mg) was positioned between two pieces of glass wool 4, 4 inside a pipe line 1, as shown in FIG. 1. Next, while He gas was being supplied from a gas supply port 2 (the flow rate being $15 \times 10^{-3}$ $dm^3$/min.), the temperature was elevated at a rate of 10° C./min from room temperature to 100° C. Subsequently, after the temperature was kept at 100° C. for 1 hour, the temperature was elevated at a rate of 5° C./min. from 100° C. to 1100° C. while He gas was being supplied. Then, the temperature was kept at 1100° C. for 2 hours. Through this series of temperature elevation, the amounts of CO and $CO_2$ within the gas discharged from a gas discharge port 6 were measured. A gas chromatograph (Varian 490-GC available from GL Sciences Inc.) was used for the measurement of CO amount and $CO_2$ amount. Note that reference numeral 5 in FIG. 1 denotes a heating furnace. By the measurement as described above, the values of the amounts of CO and $CO_2$ discharged at various temperatures were obtained.

Mean Particle Size ($D_{50}$)

The mean particle size ($D_{50}$) is a particle size at which the cumulative volume reaches 50%. The mean particle size ($D_{50}$) was obtained by measuring particle size distribution using a laser scattering method with the use of a particle size analyzer (LA-950 available from Horiba. Ltd.).

TABLE 1

| Carbon | Heat treatment | Template size (nm) | Pore diameter (nm) | Carbon source | Mixture ratio Carbon source | Mixture ratio Template source | Cleaning solution | BET specific surface area ($m^2$/g) | Total pore volume (mL/g) | Micro-pore volume (mL/g) | Meso-pore volume (mL/g) | Measured CO amount (mmol/g) | Measured $CO_2$ amount (mmol/g) | $D_{50}$ (μm) |
|---|---|---|---|---|---|---|---|---|---|---|---|---|---|---|
| A1 | No | 4 | 4 | Mg citrate | — | — | Sulfuric acid | 1459 | 1.68 | 0.52 | 1.15 | 1.628 | 0.340 | 94 |
| A2 | Yes 400° C. | 4 | 4 | Mg citrate | — | — | Sulfuric acid | 1451 | 1.68 | 0.52 | 1.16 | 1.470 | 0.226 | 103 |
| A3 | Yes 700° C. | 4 | 4 | Mg citrate | — | — | Sulfuric acid | 1549 | 1.80 | 0.56 | 1.25 | 0.930 | 0.080 | 58 |
| A4 | Yes 1000° C. | 4 | 4 | Mg citrate | — | — | Sulfuric acid | 1514 | 1.68 | 0.54 | 1.14 | 0.057 | 0.029 | 92 |
| A5 | No | 10 | 10 | PVA | 5 | 5 | Sulfuric acid | 1103 | 2.07 | 0.41 | 1.65 | 1.176 | 0.221 | 6 |
| A11 | No | 10 | 12 | PVA | 5 | 5 | Hydrochloric acid | 1237 | 1.70 | 0.45 | 1.25 | 1.821 | 0.187 | — |
| A12 | No | 10 | 12 | PVA | 5 | 5 | Nitric acid | 1249 | 1.24 | 0.45 | 0.79 | 3.114 | 0.863 | — |
| A13 | No | 10 | 11 | PVA | 3 | 7 | Sulfuric acid | 1319 | 1.52 | 0.48 | 1.04 | 2.550 | 0.501 | 11 |
| A8 | Yes 700° C. | 10 | 11 | PVA | 5 | 5 | Sulfuric acid | 1092 | 2.08 | 0.41 | 1.68 | 0.438 | 0.050 | 5 |
| A6 | No | 30 | 26 | PVA | 5 | 5 | Sulfuric acid | 886 | 2.06 | 0.34 | 1.73 | 0.907 | 0.184 | 4 |
| A7 | No | 150 | 190 | PVA | 5 | 5 | Sulfuric acid | 333 | 0.54 | 0.13 | 0.41 | 0.746 | 0.162 | 6 |

TABLE 2

| Carbon | Heat treatment | Template size (nm) | Pore diameter (nm) | Carbon source | Mixture ratio Carbon source | Mixture ratio Template source | Cleaning solution | BET specific surface area ($m^2$/g) | Total pore volume (mL/g) | Micro-pore volume (mL/g) | Meso-pore volume (mL/g) | Measured CO amount (mmol/g) | Measured $CO_2$ amount (mmol/g) | $D_{50}$ (μm) |
|---|---|---|---|---|---|---|---|---|---|---|---|---|---|---|
| A14 | No | 10 | 6 | Phenolic resin | 3 | 7 | Sulfuric acid | 1721 | 1.93 | 0.62 | 1.31 | 1.856 | 0.308 | 5 |
| A15 | No | 10 | 16 | Phenolic resin | 4 | 6 | Sulfuric acid | 1495 | 3.37 | 0.57 | 2.80 | 1.104 | 0.196 | 4 |
| A16 | No | 30 | 51 | Phenolic resin | 5 | 5 | Sulfuric acid | 929 | 1.07 | 0.36 | 0.71 | 0.069 | 0.121 | 16 |

TABLE 2-continued

| Carbon | Heat treatment | Template size (nm) | Pore diameter (nm) | Mixture ratio Carbon source | Mixture ratio Carbon source | Mixture ratio Template source | Cleaning solution | BET specific surface area ($m^2/g$) | Total pore volume (mL/g) | Micropore volume (mL/g) | Mesopore volume (mL/g) | Measured CO amount (mmol/g) | Measured $CO_2$ amount (mmol/g) | $D_{50}$ (μm) |
|---|---|---|---|---|---|---|---|---|---|---|---|---|---|---|
| A9 | Yes 400° C. | 10 | 11 | PVA | 5 | 5 | Sulfuric acid | 1107 | 2.09 | 0.41 | 1.68 | — | — | — |
| A10 | Yes 1000° C. | 10 | 11 | PVA | 5 | 5 | Sulfuric acid | 1135 | 2.15 | 0.42 | 1.73 | — | — | — |

As clearly seen from Tables 1 and 2, when the template size is greater, the pore diameter is greater while the BET specific surface area is smaller. In addition, when the template size and the pore diameter are greater, the micropore volume is smaller, but the mesopore volume and the total pore volume show little relevance thereto. Furthermore, when the template size and the pore diameter are greater, the CO amount and the $CO_2$ amount are smaller, but the mean particle size shows little relevance thereto.

As clearly seen from Table 1, when a comparison is made between the carbon A1, which has not been heat-treated, and the carbons A2 to A4, which have been heat-treated at 400° C., 700° C., and 1000° C., respectively, little variation is observed in the BET specific surface area, the total pore volume, the micropore volume, and the mesopore volume, while large variations are observed in the CO amount and the $CO_2$ amount. This demonstrates that it is possible to change the amount of the functional groups and the ratio of the functional groups while inhibiting the pore structure from changing. Also as clearly seen from Tables 1 and 2, when a comparison is made between the carbon A5, which has not been heat-treated, and the carbons A8 to A10, which have been heat-treated respectively at 700° C., 400° C., and 1000° C., little variation is observed in the BET specific surface area, the total pore volume, the micropore volume, and the mesopore volume. From this point as well, it is observed that the pore structure does not change because of the heat treatment.

Figure 2:
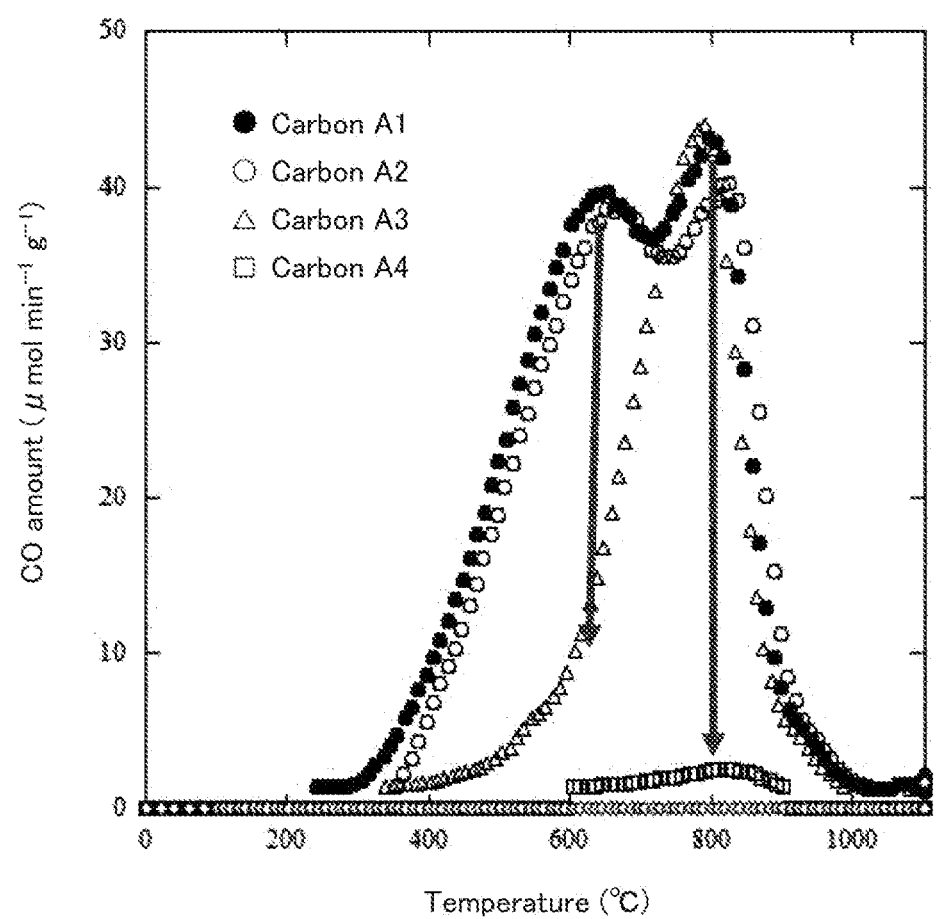
FIG. 2. is a graph showing the relationship between temperature and CO amount in carbons A1 to A4.

Furthermore, as is clear from FIG. 2, although large variations are not observed between the carbon A1, which has not been heat-treated, and the carbon 42, which has been heat-treated at 400° C. However, the carbon A3, which has been heat-treated at 700° C., shows a significant drop in the CO amount at a peak around 600° C. in comparison with the carbon A1, which has not been heat-treated. Furthermore, the carbon A4, which has been heat-treated at 1000° C., shows a significant drop at a peak around 800° C., and also shows significantly lower values overall, in comparison with the carbon A3, which has been heat-treated at 700° C.

Figure 3:
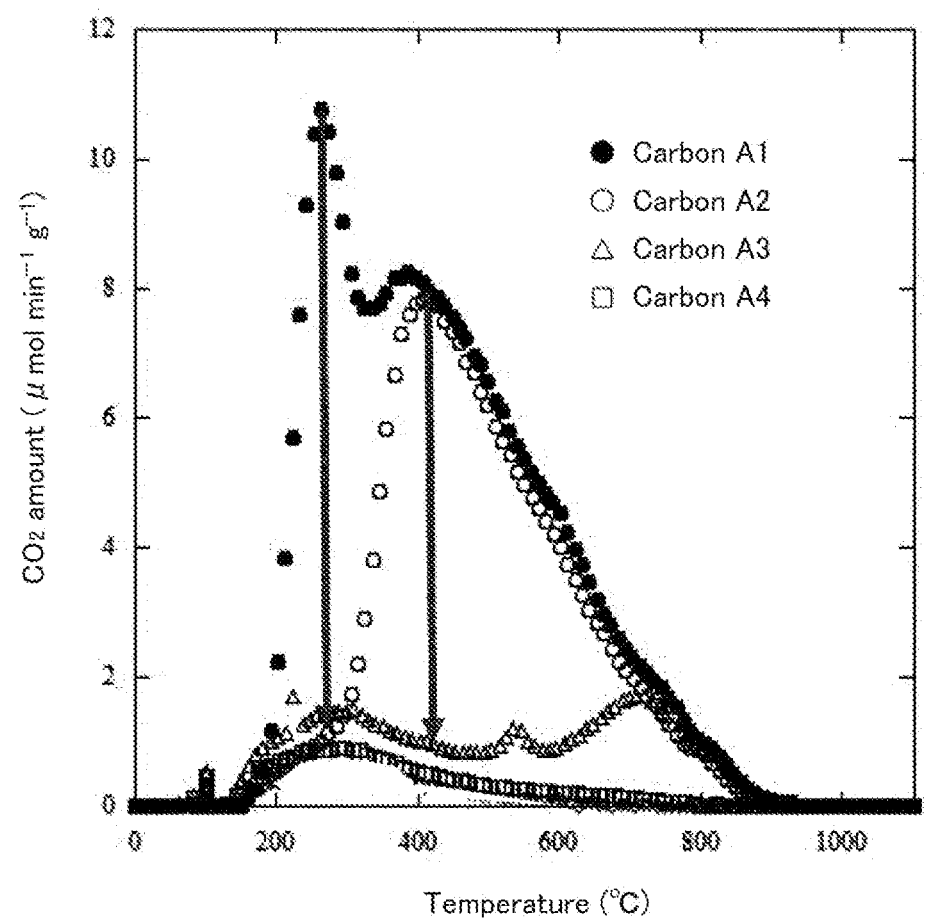
FIG. 3 is a graph showing the relationship between temperature and $CO_2$ amount in carbons A1 to A4.

In addition, as is clear from FIG. 3, the carbon A2, which has been heat-treated at 400° C., shows a large drop at a peak around 300° C. in comparison with the carbon A1, which has not been heat-treated, and the carbon A3, which has been heat-treated at 700° C., shows a significant drop at a peak around 400° C. in comparison with the carbon A2, which has been heat-treated at 400° C. Furthermore, the carbon A4, which has been heat-treated at 1000° C., shows significantly lower $CO_2$ amounts overall in comparison with the carbon A3, which has been heat-treated at 700° C.

Figure 4:
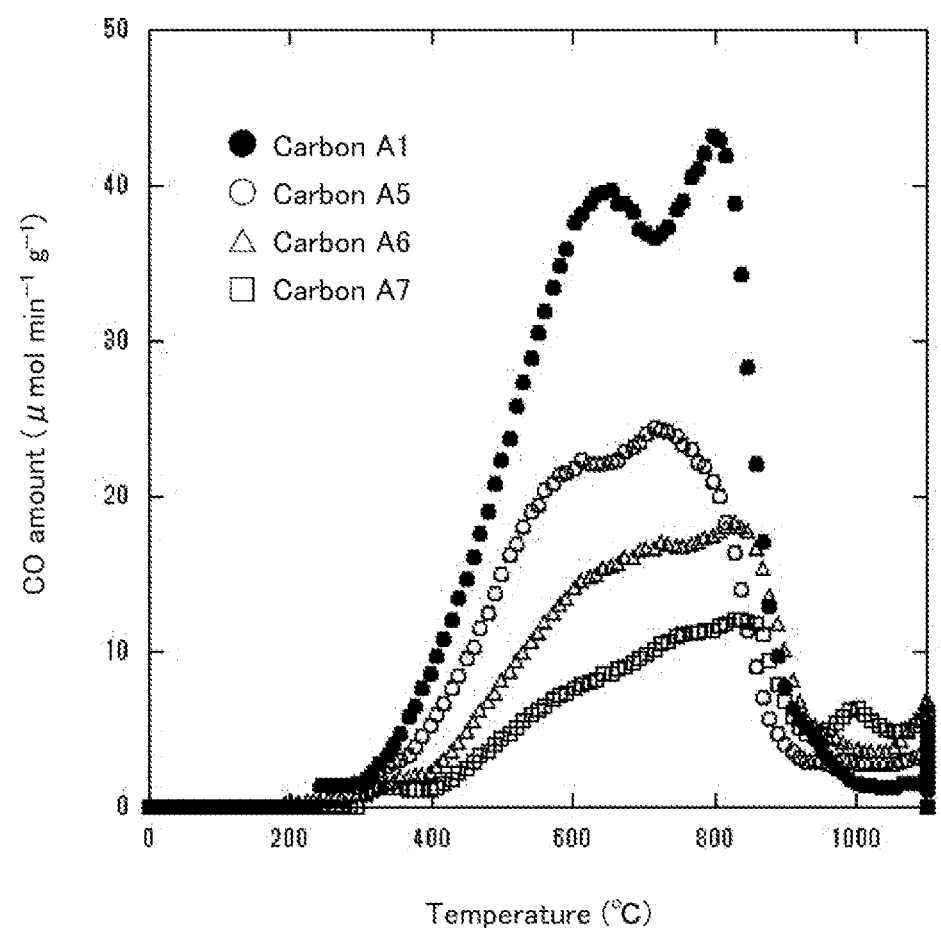
FIG. 4 is a graph showing the relationship between temperature and CO amount in carbon A1 and carbons A5 to A7.
Figure 5:
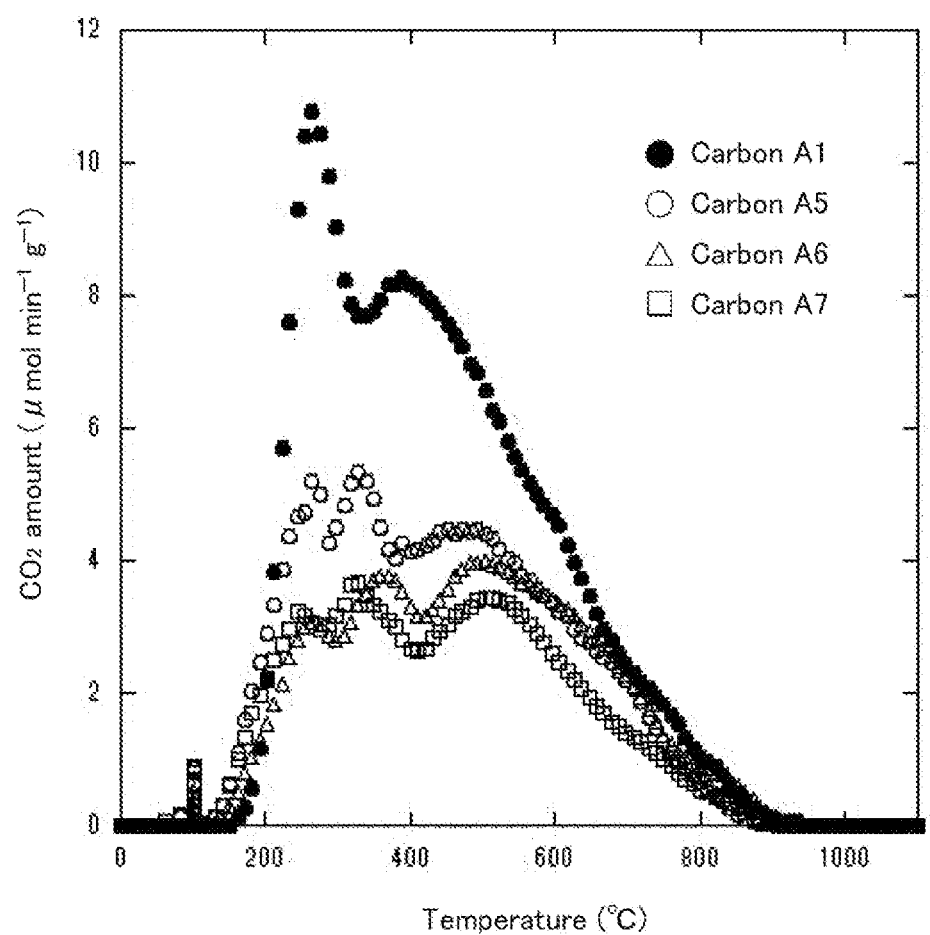
FIG. 5 is a graph showing the relationship between temperature and $CO_2$ amount in carbon A1 and carbons A5 to A7.

In addition, as clearly seen from FIGS. 4 and 5, when the carbons A1 and A5 to A7 with varying particle sizes are compared, it is Observed that those with greater particle sizes generally show smaller CO amounts and $CO_2$ amounts.

Figure 6:
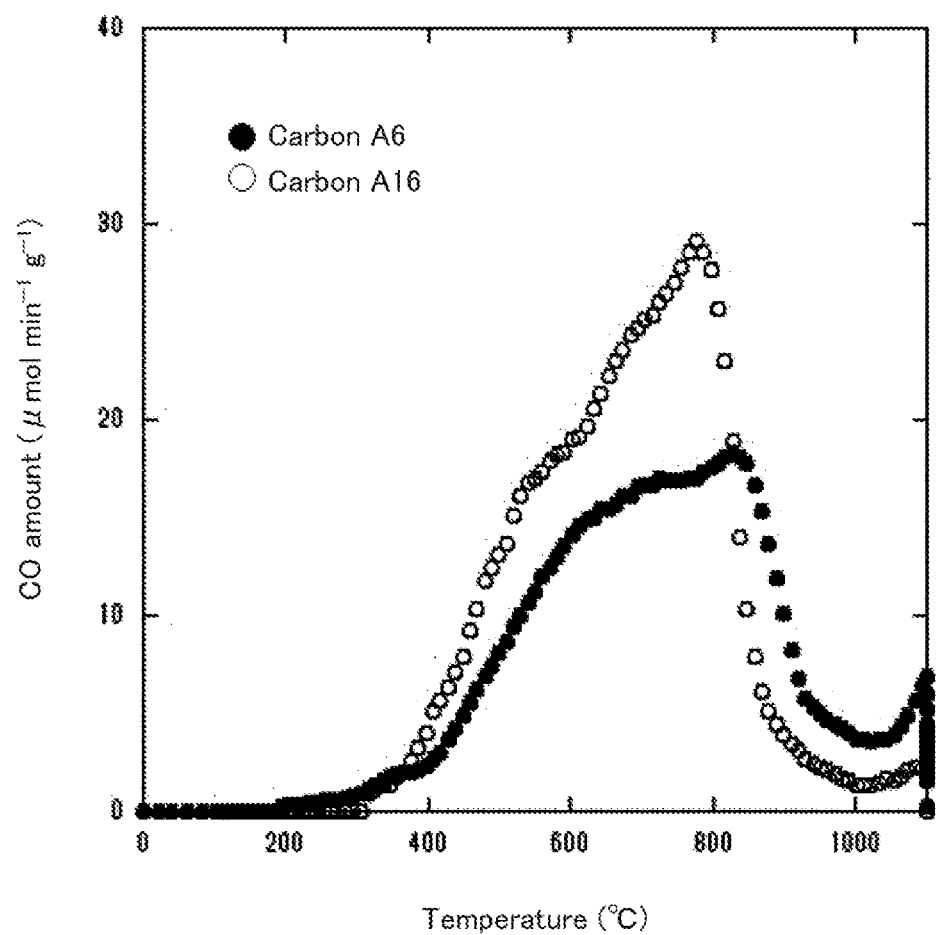
FIG. 6 is a graph showing the relationship between temperature and CO amount in carbons A6 and A16.
Figure 7:
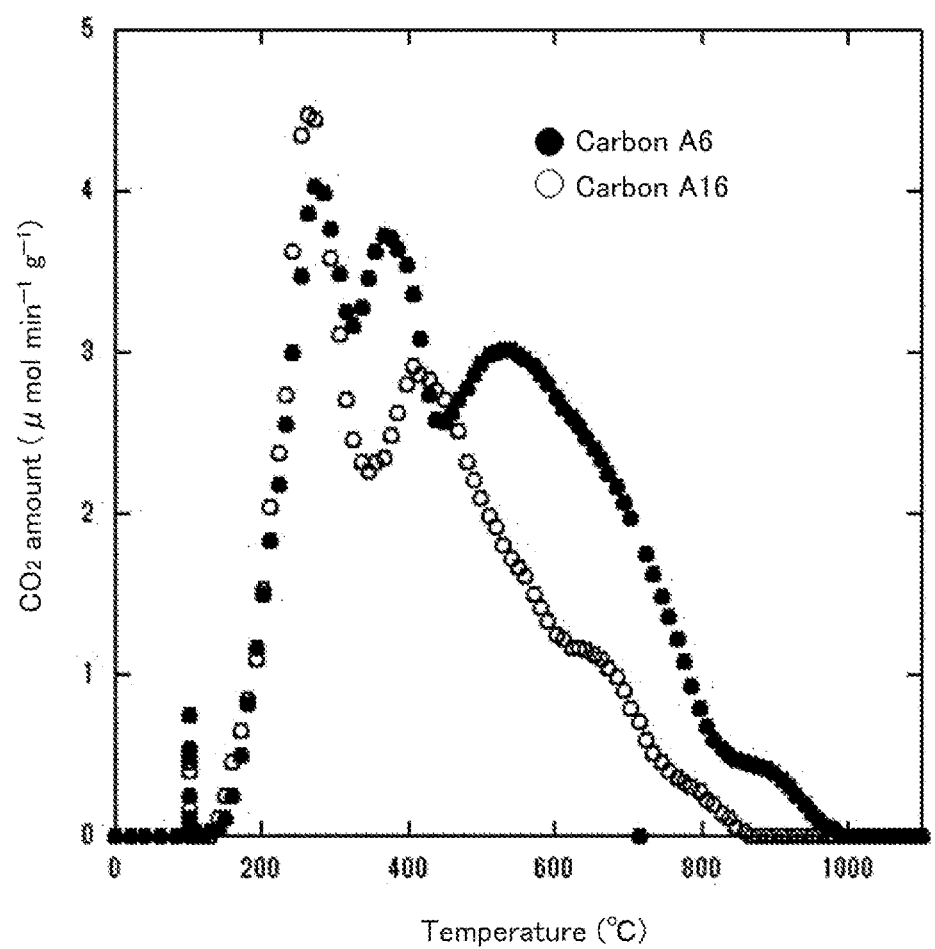
FIG. 7 is a graph showing the relationship between temperature and $CO_2$ amount in carbons A6 and A16.

Furthermore, as clearly seen from FIGS. 6 and 7, when a comparison is made between the carbon A6, which uses MIA as the carbon source, and the carbon A16, which uses phenolic resin as the carbon source, it is observed that the CO amount is slightly greater in the carbon A16 while the $CO_2$ amount is slightly greater in the carbon A6.

Figure 8:
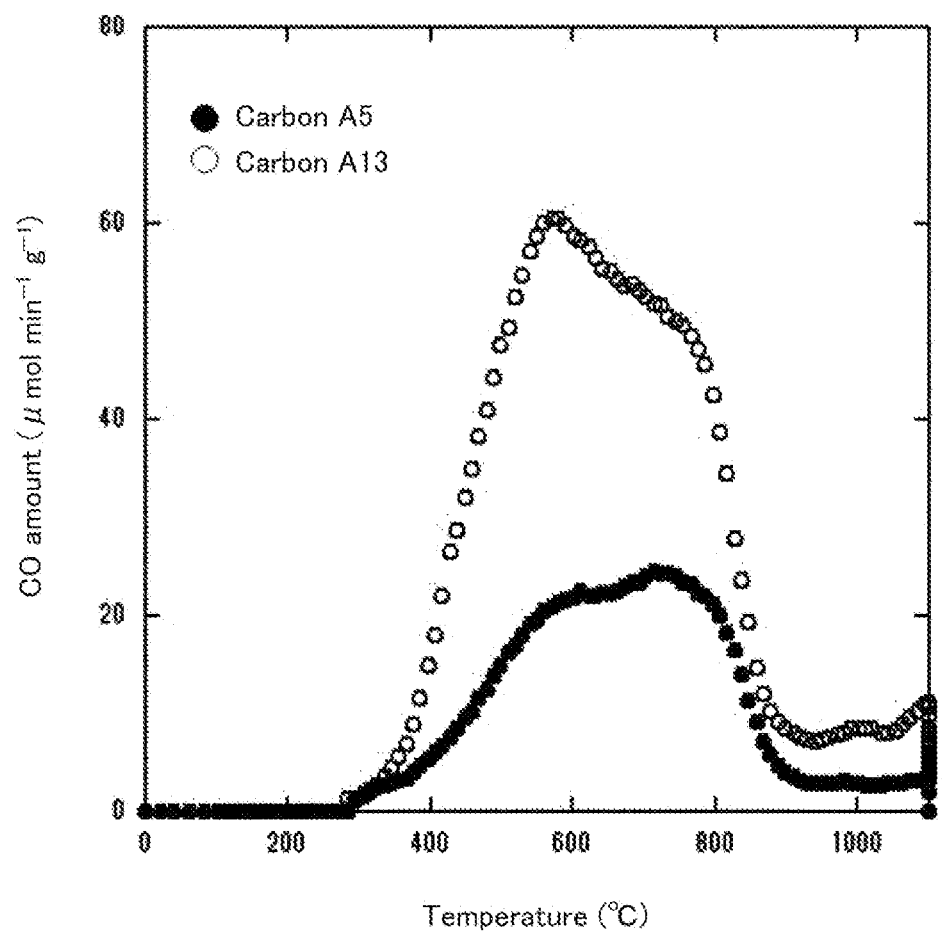
FIG. 8 is a graph showing the relationship between temperature and CO amount in carbons A5 and A13.
Figure 9:
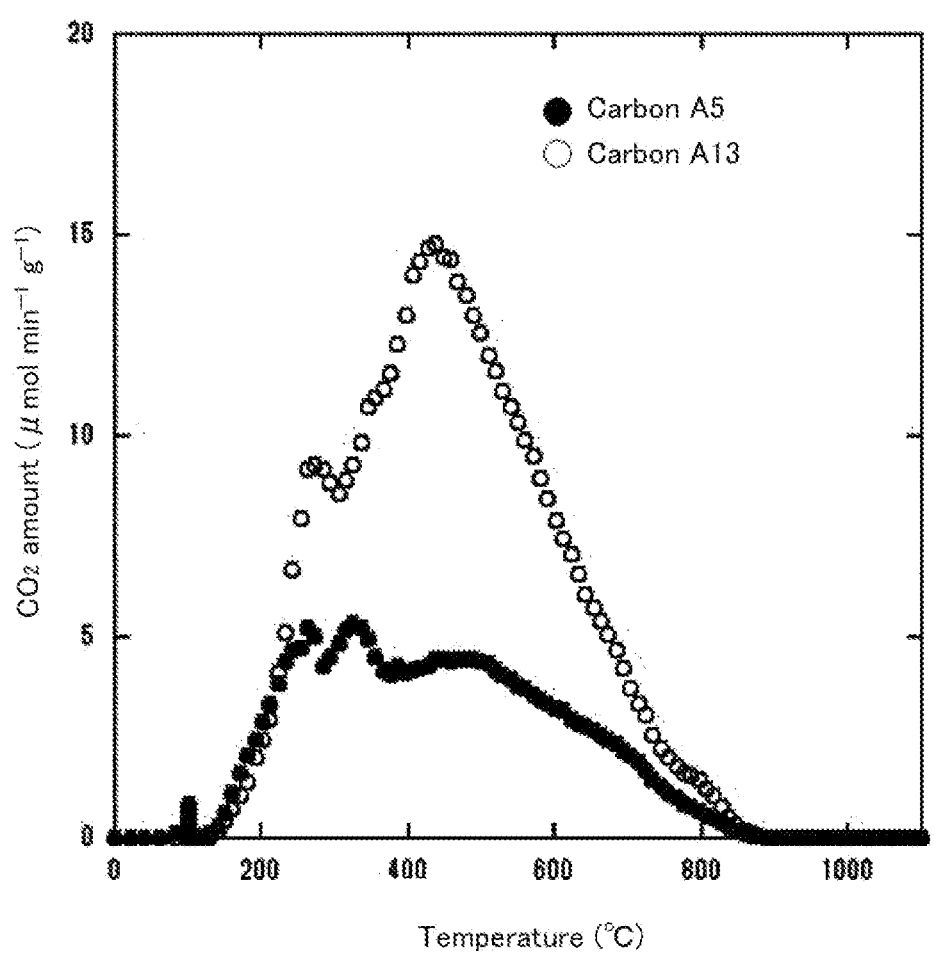
FIG. 9 is a graph showing the relationship between temperature and $CO_2$ amount in carbons A5 and A13.

In addition, as clearly seen from Tables 1 and 2 and FIGS. 8 and 9, when a comparison is made between the carbon A5 and carbon A13, which both use PVA as the carbon source but differ in the template proportion, it is observed that the CO amount and the $CO_2$ amount are greater in the carbon A13, which has a higher template proportion.

Figure 10:
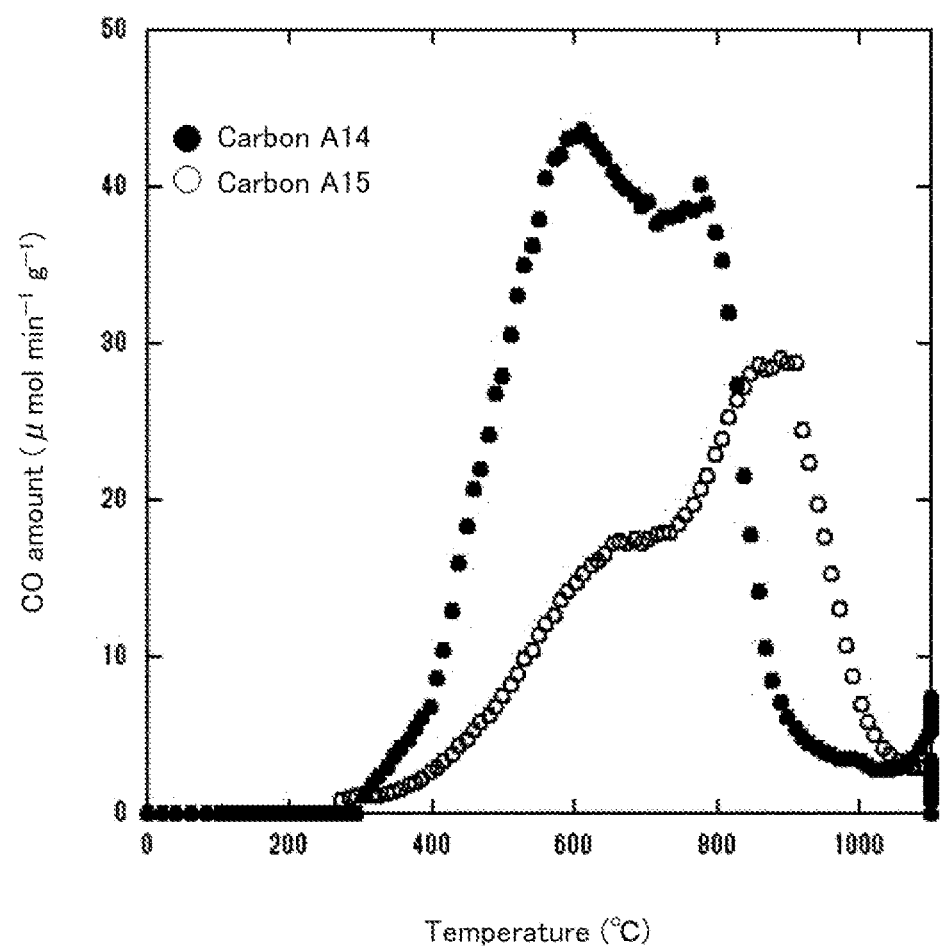
FIG. 10 is a graph showing the relationship between temperature and CO amount in carbons A14 and A15.
Figure 11:
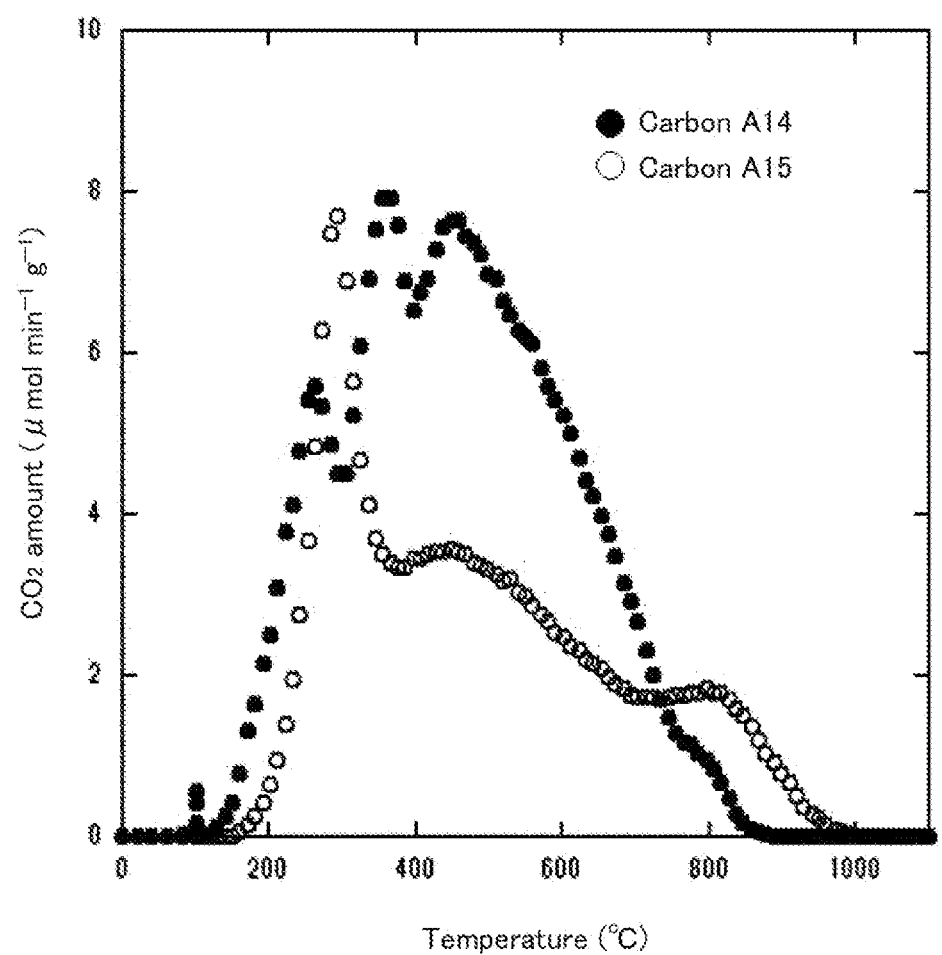
FIG. 11 is a graph showing the relationship between temperature and $CO_2$ amount in carbons A14 and A15.

Likewise, as clearly seen from FIGS. 10 and 11, when a comparison is made between the carbons A14 and the carbon A15, which both use phenolic resin as the carbon source but differ in the template proportion, it is observed that the CO amount and the $CO_2$ amount are greater in the carbon A14, which has a higher template proportion.

Figure 12:
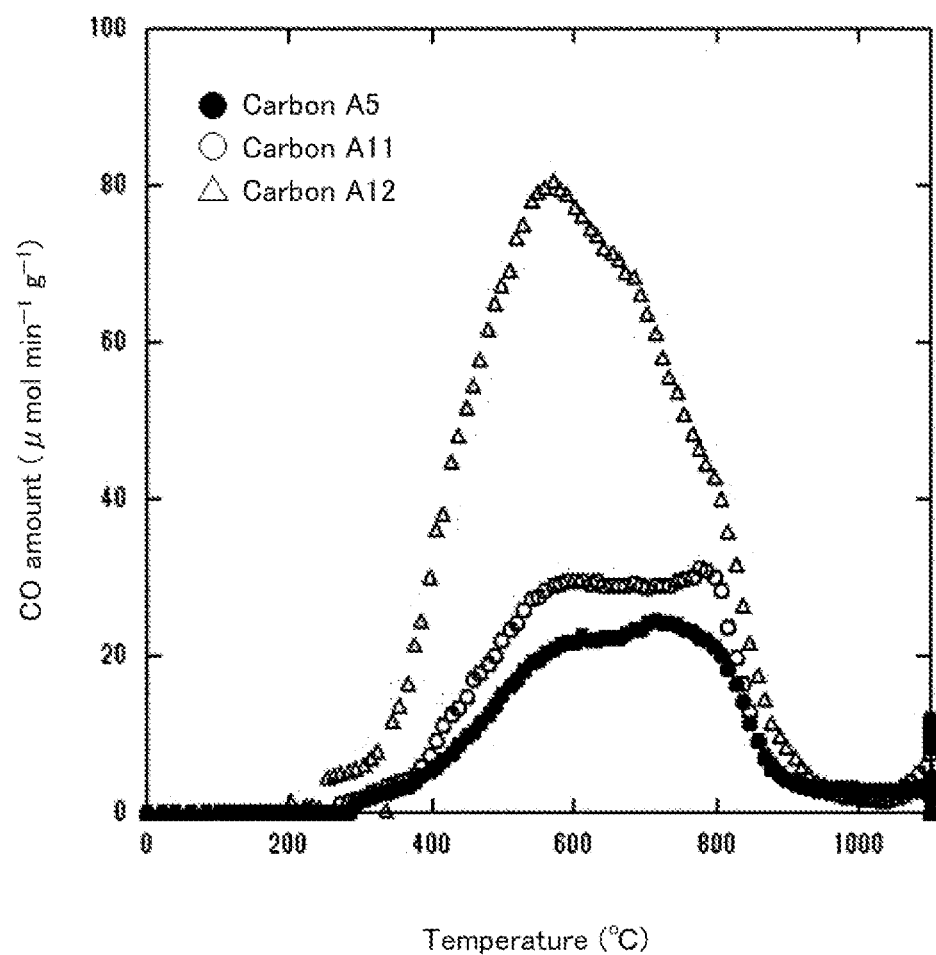
FIG. 12 is a graph showing the relationship between temperature and CO amount in carbons A5, A11, and A12.
Figure 13:
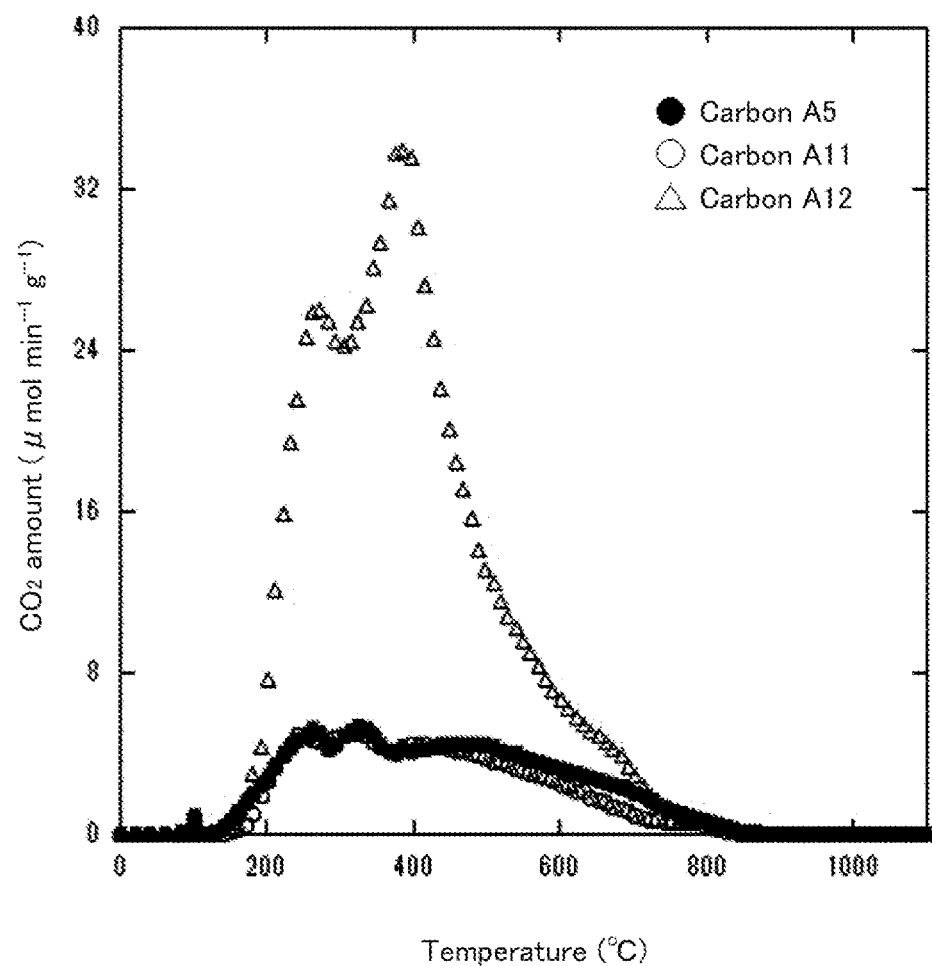
FIG. 13 is a graph showing the relationship between temperature and $CO_2$ amount n carbons A5, A11, and A12.

Furthermore, as clearly seen from Tables 1 and 2 and FIGS. 12 and 13, when a comparison is made between the carbon A5, which uses sulfuric acid as the removing solution, the carbon A11, which uses hydrochloric acid as the removing solution, and the carbon A12, which uses nitric acid as the removing solution, it is observed that the CO amount is greater, in ascending order, in the carbon A5, which uses sulfuric acid, then in the carbon A11, which uses hydrochloric acid, and in the carbon A12, which uses nitric acid. It is also observed that the $CO_2$ amount is greater, in ascending order, in the carbon A11, which uses hydrochloric acid, then in the carbon A5, which uses sulfuric acid, and in the carbon A12, which uses nitric acid.

Also, as clearly seen from Tables 1 and 2, when a comparison is made between the carbons A1 to A4, which are either heat-treated or not heat-treated and differ in the heat treatment temperature, they show substantially similar micropore volumes. Likewise, when the carbons A5, A9, and A10, which are either heat-treated or not heat-treated and differ in the heat treatment temperature, they also show substantially similar micropore volumes.

Furthermore, when a comparison is made between the carbons A5, A11, and A12, which employ different types of removing solutions, they also show substantially similar micropore volumes. In addition, when a comparison is made between the carbons A6 and A16, which employ different carbon sources, they also show substantially similar micropore volumes.

Also, when a comparison is made between the carbons A5 and A13, which are different in the mixing ratio of the carbon source and the template source, the micropore volume slightly increases when the mixing ratio of the template source is larger, but a large variation is not observed. Also, when a comparison is made between the carbons A14 and A15, which are different in the mixing ratio of the carbon source and the template source, a similar tendency is also observed.

On the other hand, when a comparison is made between the carbons A5 to A7 with varying template sizes, it is observed that the micropore volume varies greatly.

From the above discussion, it is understood that when it is desired to change the micropore volume, the template size should be changed, and when it is not desired to change the micropore volume, the other conditions should be changed.

Experiment 2

For the carbons A1 to A8 and A11 to A16, the BET specific surface area, the measured CO amount, the amount of acid anhydride, the total amount of ether groups and hydroxy groups, the total amount of quinone and carbonyl groups, the amount at a peak around 1000° C., the measured $CO_2$ amount, the amount of carboxyl groups, the amount of lactone, the measured CO amount+$CO_2$ amount, the terminal $H_2$ amount, and the edge amount were determined in the following methods. The results are shown in Tables 3 and 4. As for the amount at a peak around 1000° C., no peak was observed for the carbons A1 to A4 and A12. The edge amount was measured only for the carbons A1 and A5 to A7, and the terminal $H_2$ amount was calculated only for the carbons A1 and A5 to A7.

Figure 14:
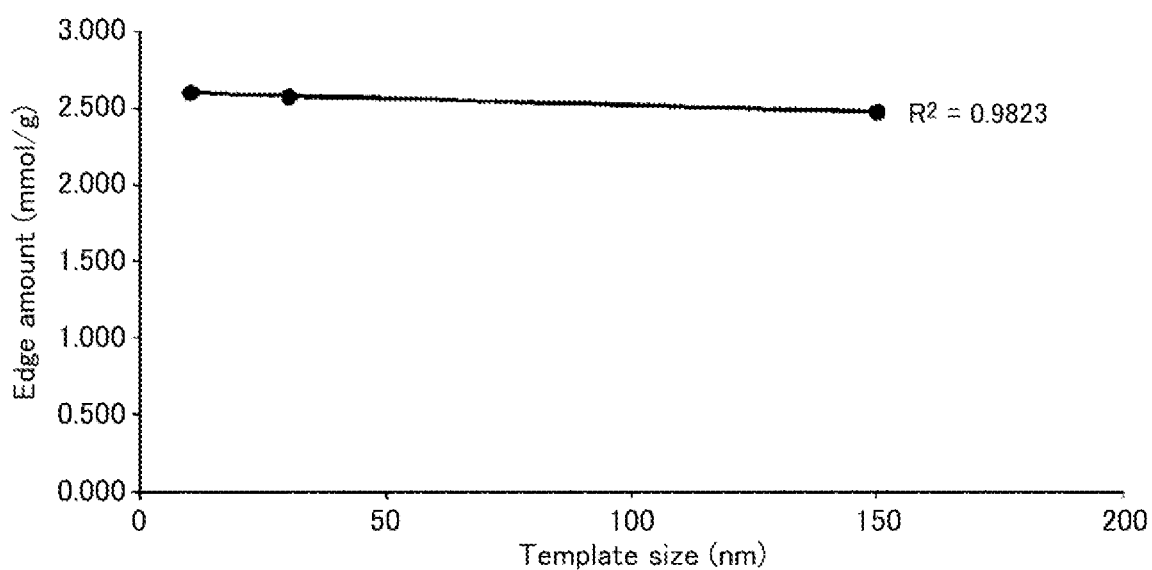
FIG. 14 is a graph showing the relationship between template size and edge amount.
Figure 15:
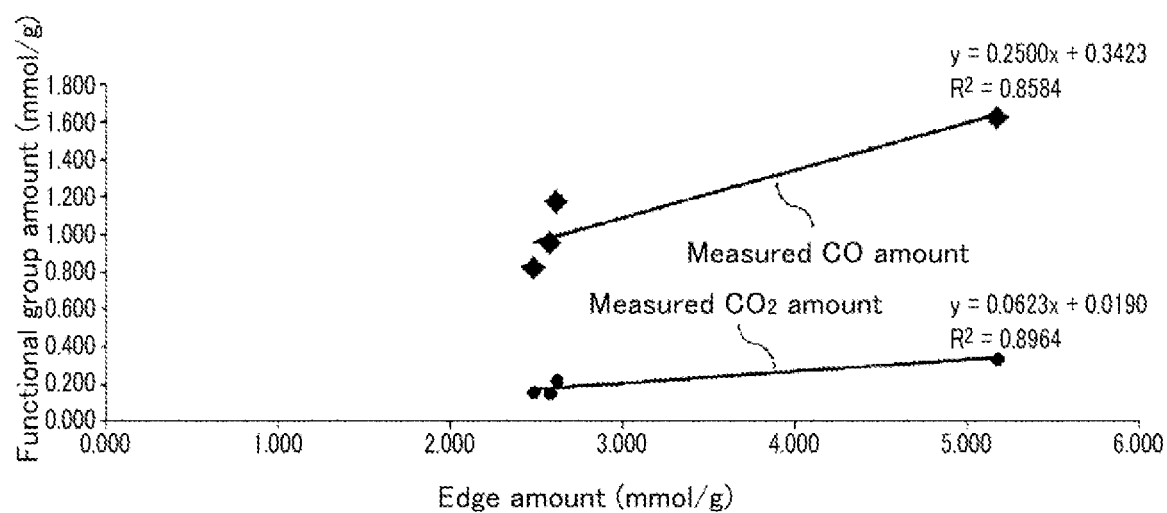
FIG. 15 is a graph showing the relationship between edge amount and functional group amount.
Figure 16:
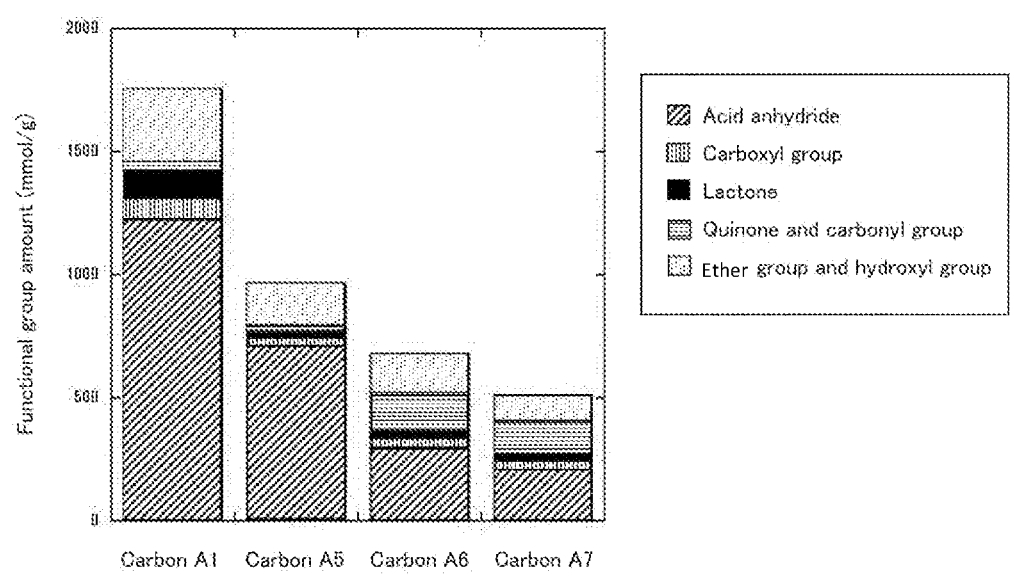
FIG. 16 is a graph showing the amounts of functional groups in carbon A1 and carbons A5 to A7.
Figure 17:
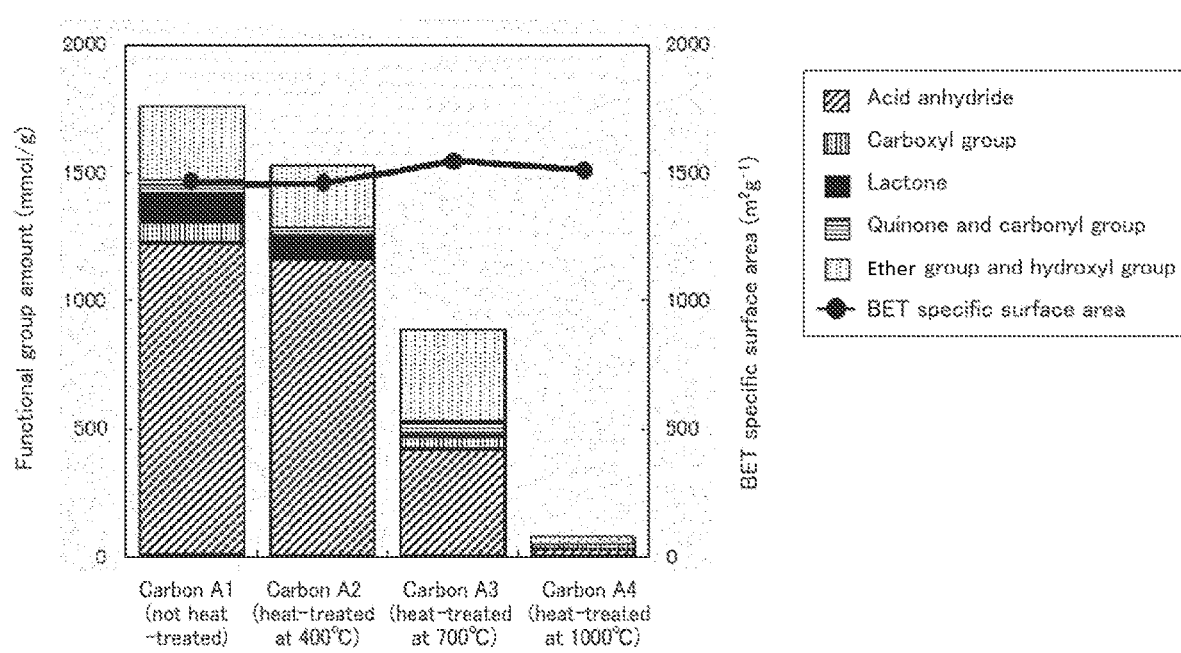
FIG. 17 is a graph showing the relationship between functional group amount and BET specific surface area in carbons A1 to A4.

Further, from the foregoing results, the relationship between the template size and the *e amount is shown in FIG. 14, and the relationship between the edge amount and the amount of functional groups (measured CO amount and measured $CO_2$ amount) is shown in FIG. 15. The amounts of functional group for the carbons A1 and A5 to A7 are shown in FIG. 16, and the amounts of functional groups for the carbons A1 to A4 are shown in FIG. 17.

BET specific surface area, CO amount (measured value), and $CO_2$ amount (measured value)

These were measured in the same manners as described in Experiment 1 above.

Figure 18:
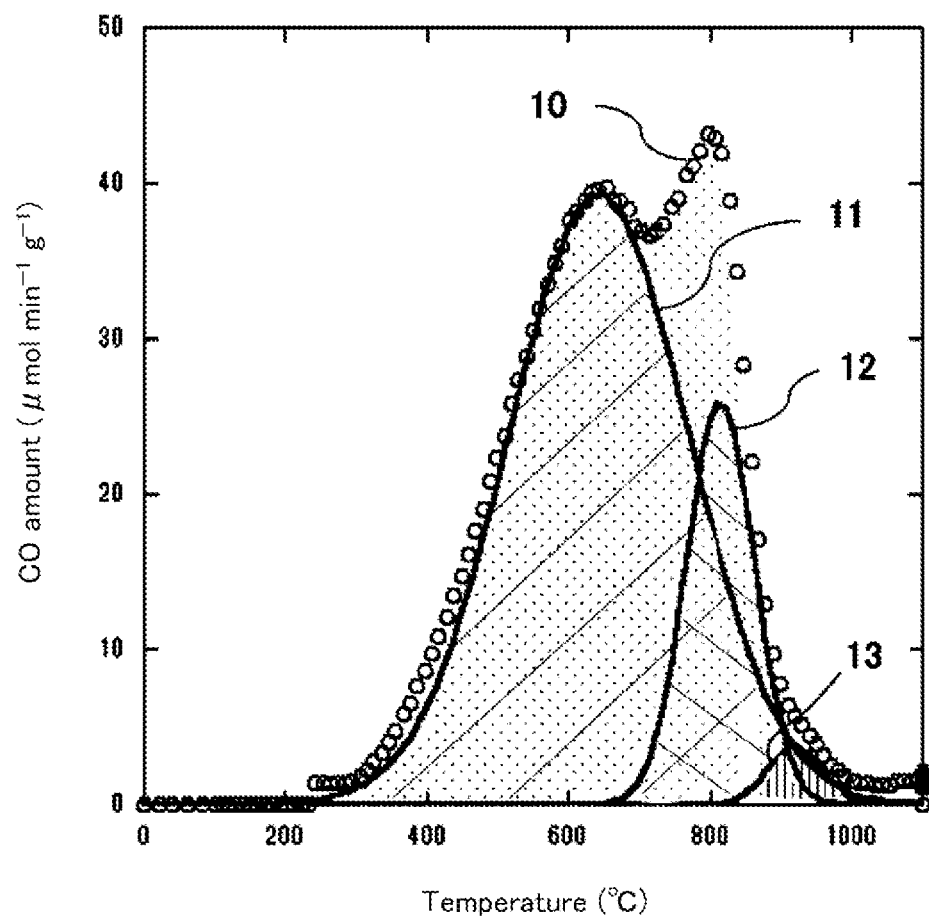
FIG. 18 is a graph showing the relationship between temperature and CO amount.

Amount of acid anhydride, total amount of ether groups and hydroxy groups, and total amount of quinone and carbonyl groups FIG. 18 shows a graph illustrating the relationship between temperature and CO amount for the carbon A1, which was obtained by the measurement in Experiment 1 described above. The calculation method for the amounts of these substances is shown below with reference to FIG. 18.

A curve 10 (the curve connecting the white circles) represents amounts of CO discharged at various temperatures, and the area enclosed by the curve 10 and the horizontal axis (the area indicated by dots in FIG. 18) represents the total amount of the discharged CO, which is the measured CO amount. Then, it is known that the amount of desorbed and discharged CO reaches the maximum at about 600° C. for acid anhydride, at about 800° C. for ether group and hydroxy group, and at about 900° C. for quinone and carbonyl group. Based on this knowledge, waveform separation is carried out from the curve 10 into a curve 11 (amount of acid anhydride), a curve 12 (amount of ether groups and hydroxy groups), and a curve 13 (amount of quinone and carbonyl groups). Thus, the area enclosed by the curve 11 and the horizontal axis (i.e., the hatched area indicated by lines that slope upward from left to right in FIG. 18) represents the total amount of discharged acid anhydride, the area enclosed by the curve 12 and the horizontal axis (i.e., the hatched area indicated by lines that slope downward from left to right in FIG. 18) represents the total amount of discharged ether groups and hydroxy groups, and the area enclosed by the curve 13 and the horizontal axis (i.e., the hatched area indicated by vertical lines in FIG. 18) represents the total amount of discharged quinone and carbonyl groups. In the same manner, the amounts were obtained for the carbons A2 to A8 as well.

Amount of Carboxyl Groups and Amount of Lactone

Figure 19:
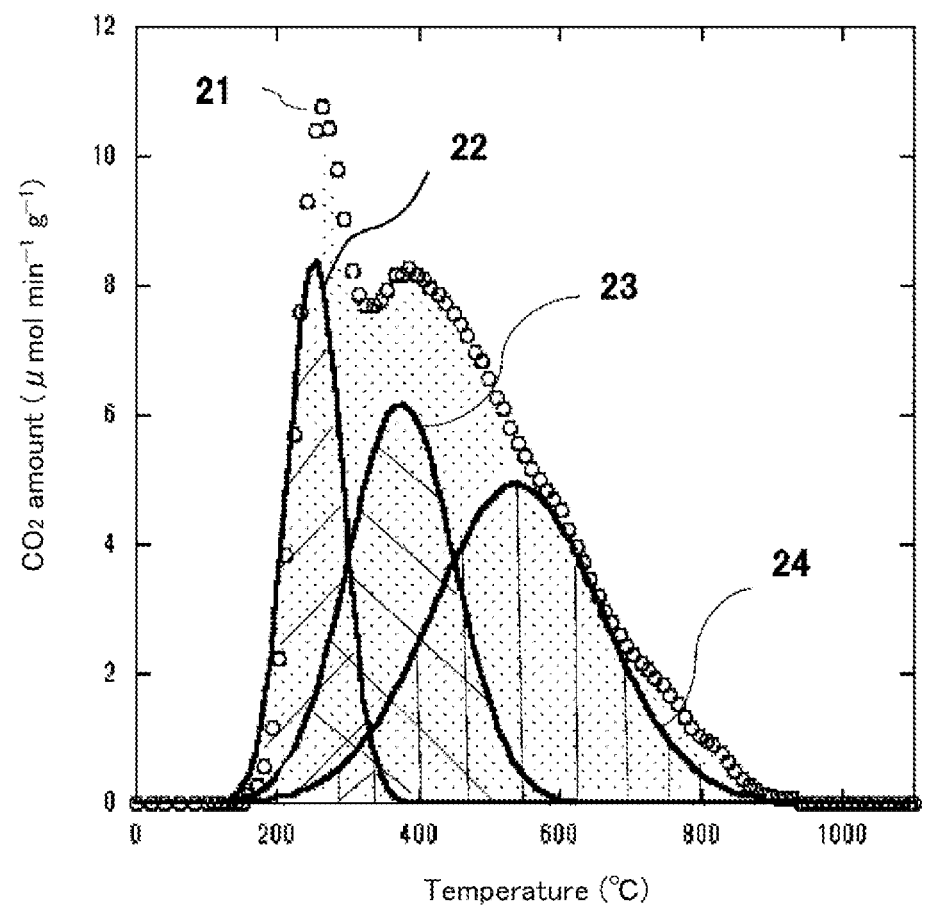
FIG. 19 is a graph showing the relationship between temperature and $CO_2$ amount.

FIG. 19 shows a graph illustrating the relationship between temperature and $CO_2$ amount for the carbon A1, which was obtained by the measurement in Experiment 1 described above. The calculation method for the amounts of these substances is shown below with reference to FIG. 19.

A curve 21 (the curve connecting the white circles) represents amounts of $CO_2$ discharged at various temperatures, and the area enclosed by the curve 21 and the horizontal axis (the area indicated by dots in FIG. 19) represents the total amount of the discharged $CO_2$, which is the measured $CO_2$ amount. Then, it is known that the amount of desorbed and discharged $CO_2$ reaches the maximum at about 250° C. for carboxyl groups, at about 400° C. for lactone, and at about 600° C. for acid anhydride. Based on this knowledge, waveform separation is carried out from the curve 21 into a curve 22 (amount of carboxyl groups), a curve 23 (amount of lactone), and a curve 24 (amount of acid anhydride). Thus, the area enclosed by the curve 22 and the horizontal axis (i.e., the hatched area indicated by lines that slope upward from left to right in FIG. 19) shows the total amount of discharged carboxyl groups, the area enclosed by the curve 23 and the horizontal axis (i.e., the hatched area indicated by lines that slope downward from left to right in FIG. 19) shows the total amount of discharged lactone, and the area enclosed by the curve 24 and the horizontal axis (i.e., the hatched area indicated by vertical lines in FIG. 19) shows the total amount of discharged acid anhydride. It should be noted that the amount of acid anhydride that is obtained from the measured $CO_2$ amount is significantly smaller than the previously-mentioned amount of acid anhydride that is obtained from the measured CO amount. For this reason, the amount of acid anhydride that is obtained from the measured CO amount is defined as the amount of acid anhydride in the present description.

In the same manner, the amounts were obtained for the carbons A2 to A5 as well.

Edge Amount

The edge amount was measured with the apparatus shown in FIG. 1 using the TPO (Temperature Programmed Oxidation) method. Specifically, the method used was as follows.

First, a sample 3 (the amount of the sample being 100 mg) is positioned between two pieces of glass wool 4, 4 inside a pipe line 1, as shown in FIG. 1. Next, while He gas is being supplied from a gas supply port 2. (the flow rate being $200 \times 10^{-3}$ $dm^3$/min.), the temperature is elevated at a rate of 20° C./min from room temperature to 800° C. Subsequently, while He gas (the flow rate being $180 \times 10^{-3}$ $dm^3$/min) and $O_2$ gas (the flow rate being $20 \times 10^{-3}$ $dm^3$/min.) are being supplied from a gas supply port 2, the temperature is elevated at a rate of 5° C./min from 800° C. to 1000° C., and thereafter, the temperature is kept at 1000° C. for 2 hours. Then, the amount of the desorbed water content in the gas that was discharged from a gas discharge port 6 was obtained, and the edge amount was calculated from the desorbed water content. For the measurement of the desorbed water content, a Karl Fischer moisture titrator (MKC-610 available from Kyoto Electronics Manufacturing Co., Ltd.) was used.

Note that the term "edge portion" in the present description refers to a site present on the carbon surface that can be terminated by a functional group. Also, the term "edge amount" refers to an amount (mmol/g) of edge portions that are present within 1 g of the sample.

Terminal $H_2$ Amount

The terminal $H_2$ amount was calculated by subtracting the total amount of the functional groups from the edge amount. Note that the term "total amount of functional groups" refers to the total sum of the amount of acid anhydride, the total amount of ether groups and hydroxy groups, the total amount of quinone and carbonyl groups, the amount of carboxyl groups, and the amount of lactone, in Tables 3 and 4.

nonahydrate or the like) or a mixture of an organic resin (PVA or the like) and a template (MgO particles), or whether to use PVA or a phenolic resin as the organic resin].

As shown in Tables 1 to 4, it is understood that the amount of the functional groups (CO amount and $CO_2$ amount) changes when the template size is changed. More specifically, when the template size is larger, the amount of the functional groups (CO amount and $CO_2$ amount) is smaller, and the decrease in the CO amount is particularly significant. Thus, it is possible to greatly change the amounts and ratios of acid anhydride, ether groups and hydroxy groups, and

TABLE 3

| Carbon | Heat treatment | Template size (nm) | BET specific surface area (m²/g) | Measured CO amount (mmol/g) | Amount of acid anhydrate (mmol/g) | Total amount of ether groups and hydroxyl groups (mmol/g) | Total amount of quinone and carbonyl groups (mmol/g) | Amount at peak near 1000° C. (mmol/g) |
|---|---|---|---|---|---|---|---|---|
| A1 | No | 4 | 1459 | 1.628 | 1.225 | 0.304 | 0.035 | — |
| A2 | Yes 400° C. | 4 | 1451 | 1.470 | 1.155 | 0.254 | 0.019 | — |
| A3 | Yes 700° C. | 4 | 1549 | 0.930 | 0.419 | 0.365 | 0.049 | — |
| A4 | Yes 1000° C. | 4 | 1514 | 0.057 | 0.024 | 0.026 | 0.001 | — |
| A5 | No | 10 | 1103 | 1.176 | 0.705 | 0.185 | 0.020 | 0.042 |
| A11 | No | 10 | 1237 | 1.821 | 0.913 | 0.244 | 0.072 | 0.293 |
| A12 | No | 10 | 1249 | 3.114 | 2.263 | 0.325 | 0.257 | — |
| A13 | No | 10 | 1319 | 2.550 | 1.404 | 0.554 | 0.159 | 0.266 |
| A8 | Yes 700° C. | 10 | 1092 | 0.438 | 0.185 | 0.195 | 0.030 | 0.017 |
| A6 | No | 30 | 886 | 0.952 | 0.297 | 0.168 | 0.149 | 0.176 |
| A7 | No | 150 | 333 | 0.824 | 0.208 | 0.113 | 0.138 | 0.120 |
| A14 | No | 10 | 1721 | 1.856 | 1.235 | 0.262 | 0.098 | 0.228 |
| A15 | No | 10 | 1495 | 1.104 | 0.548 | 0.348 | 0.089 | 0.209 |
| A16 | No | 30 | 929 | 1.069 | 0.584 | 0.238 | 0.042 | 0.042 |

TABLE 4

| Carbon | Heat treatment | Template size (nm) | BET specific surface area (m²/g) | Measured $CO_2$ amount (mmol/g) | Amount of carboxyl groups (mmol/g) | Amount of lactone (mmol/g) | Measured CO amount + $CO_2$ amount (mmol/g) | Amount of terminal $H_2$ (mmol/g) | Edge amount (mmol/g) |
|---|---|---|---|---|---|---|---|---|---|
| A1 | No | 4 | 1459 | 0.340 | 0.079 | 0.115 | 1.968 | 3.269 | 5.171 |
| A2 | Yes 400° C. | 4 | 1451 | 0.226 | 0.003 | 0.087 | 1.696 | Unable to calculate | Not measured |
| A3 | Yes 700° C. | 4 | 1549 | 0.080 | 0.042 | 0.009 | 1.010 | Unable to calculate | Not measured |
| A4 | Yes 1000° C. | 4 | 1514 | 0.029 | 0.013 | 0.008 | 0.086 | Unable to calculate | Not measured |
| A5 | No | 10 | 1103 | 0.221 | 0.033 | 0.023 | 1.397 | 1.506 | 2.613 |
| A11 | No | 10 | 1237 | 0.187 | 0.040 | 0.039 | 2.009 | Unable to calculate | Not measured |
| A12 | No | 10 | 1249 | 0.863 | 0.235 | 0.463 | 3.977 | Unable to calculate | Not measured |
| A13 | No | 10 | 1319 | 0.501 | 0.075 | 0.258 | 3.051 | Unable to calculate | Not measured |
| A8 | Yes 700° C. | 10 | 1092 | 0.050 | 0.009 | 0.013 | 0.488 | Unable to calculate | Not measured |
| A6 | No | 30 | 886 | 0.157 | 0.041 | 0.024 | 1.110 | 1.801 | 2.577 |
| A7 | No | 150 | 333 | 0.158 | 0.035 | 0.020 | 0.982 | 1.865 | 2.481 |
| A14 | No | 10 | 1721 | 0.308 | 0.050 | 0.072 | 2.165 | Unable to calculate | Not measured |
| A15 | No | 10 | 1495 | 0.196 | 0.049 | 0.109 | 1.300 | Unable to calculate | Not measured |
| A16 | No | 30 | 929 | 0.121 | 0.037 | 0.046 | 1.190 | Unable to calculate | Not measured |

As clearly seen from Tables 1 to 4, it is understood that the type and the ratio of the functional groups can be changed by varying the template size and varying the material [whether to use metal organic acid (trimagnesium dicitrate quinone and carbonyl groups, as shown in Tables 1 to 4. Tables 1 to 4 show that when the template size is greater, acid anhydride, ether groups and hydroxy groups decrease while quinone and carbonyl groups increase.

Furthermore, as clearly seen from Tables 1 to 4, when the BET specific surface area changes, the amount of the functional groups (CO amount and $CO_2$ amount) accordingly changes. Generally, it is observed that when the BET specific surface area is greater, the amount of the functional groups is larger.

In addition, as clearly seen from FIG. 14, when the template size increases, the edge amount decreases. Also clearly seen from FIG. 15, when the edge amount decreases, the amount of the functional groups (measured CO amount and measured $CO_2$ amount) decreases. Thus, increasing the template size decreases the amount of the functional groups, and decreasing the template size increases the amount of the functional groups. Therefore, by changing the template size, it is possible to adjust the amount of the functional groups (measured CO amount and measured $CO_2$ amount) to a desired amount.

From FIG. 16, it is observed that the carbon A1 has the greatest amount of functional groups. Also, for all the carbons A1 and A5 to A7, acid anhydride is observed in the greatest amount among the five types of functional groups. Moreover, the amount of the functional groups decreases as the pore diameter increases. From the above discussion into consideration, it is possible that, because a decrease in pore diameter increases the locations where the mesopores are connected to each other, the edge amount is increased and accordingly the amount of the functional groups is increased, although it is not clearly evident.

In addition, as clearly seen from FIG. 17, when the heat treatment is carried out, the BET specific surface area and the pore diameter do not change considerably but the amounts and ratio of the functional groups change significantly.

Figure 20:
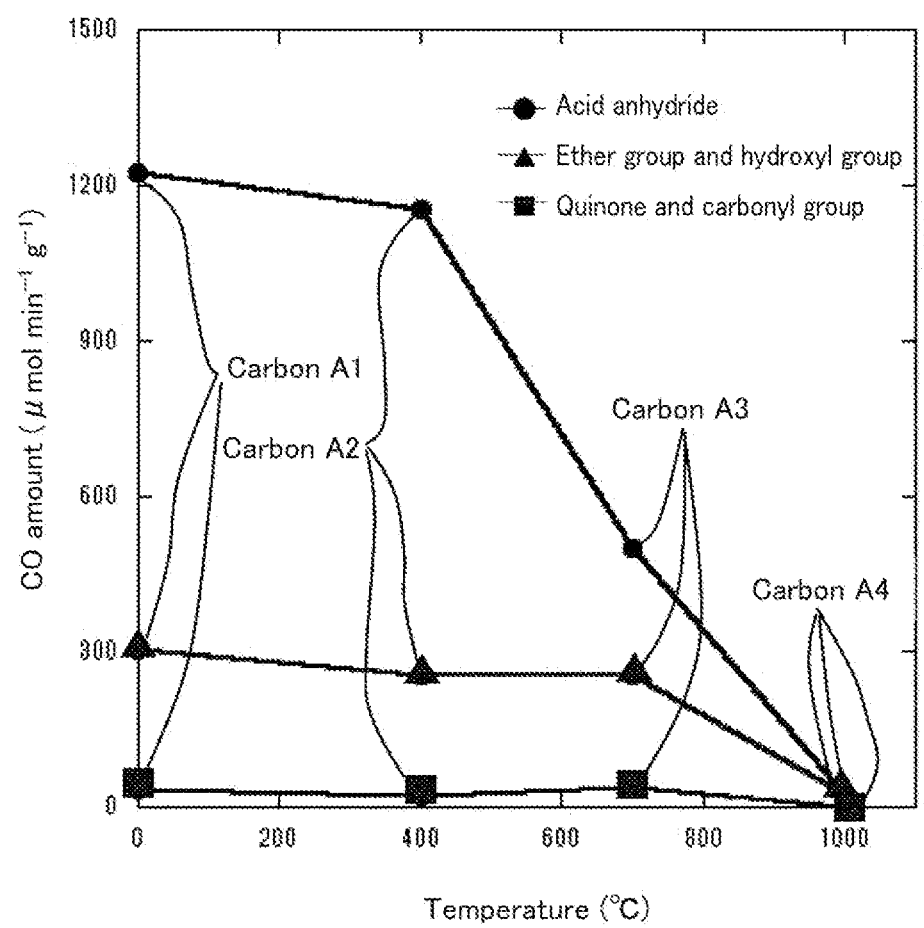
FIG. 20 is a graph showing the relationship between heat treatment temperature and CO amount.

In addition, as is clear from FIG. 20, the carbon A2, which has been heat-treated at 400° C., has a slightly smaller amount of acid anhydride and a slightly smaller total amount of ether groups and hydroxy groups than the carbon A1, which has not been heat-treated, but it shows a substantially similar total amount of quinone and carbonyl groups to that of the carbon A1. The carbon A3, which has been heat-treated at 700° C., has a substantially similar total amount of ether groups and hydroxy groups and a substantially similar total amount of quinone and carbonyl groups to those of the carbon A2, which has been heat-treated at 400° C., but it shows a significantly smaller amount of acid anhydride than the carbon A2. In the carbon A4, which has been heat-treated at 1000° C., the amounts of all the functional groups are significantly smaller than those in the carbon A3, which has been heat-treated at 700° C.

Figure 21:
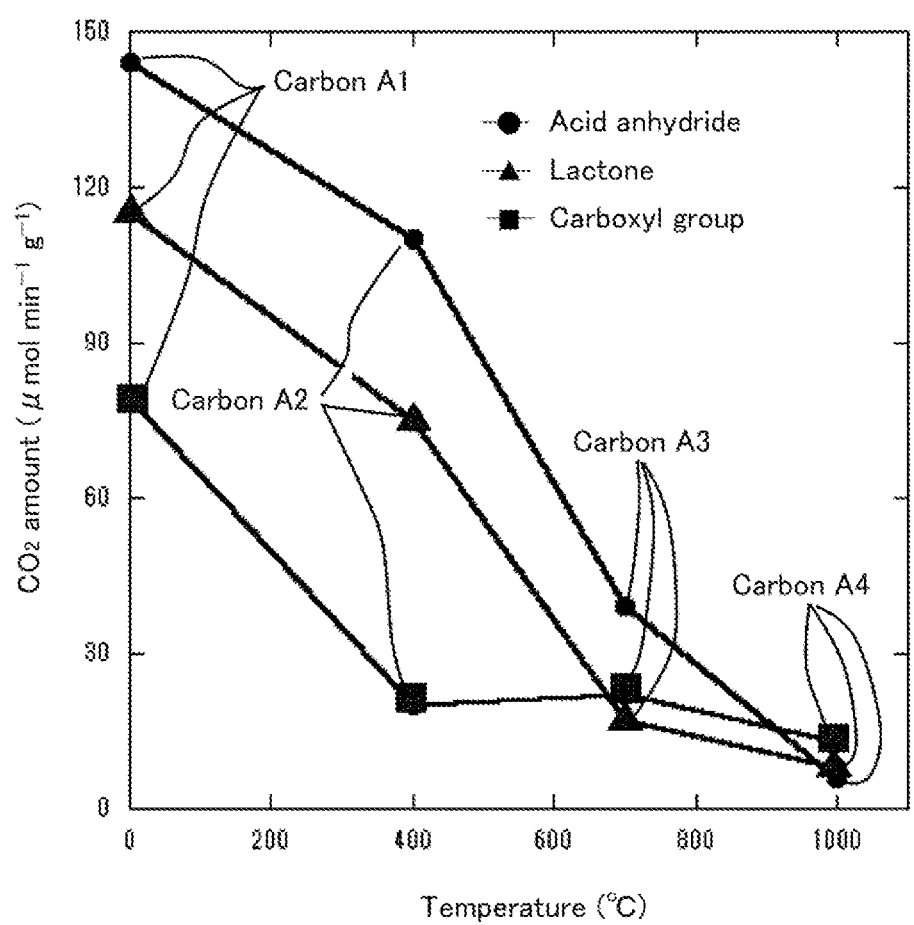
FIG. 21 is a graph showing the relationship between heat treatment temperature and $CO_2$ amount.

Also, as is clear from FIG. 21, in the carbon A2, which has been heat-treated at 400° C., the amounts of all the functional groups are significantly smaller than in the carbon A1, which has not been heat-treated. The carbon A3, which has been heat-treated at 700° C., has a substantially similar amount of carboxyl groups to that of the carbon A2, which has been heat-treated at 400° C., but it shows significantly smaller amounts of acid anhydride and lactone than the carbon A2. In the carbon A4, which has been heat-treated at 1000° C., the amounts of all the functional groups are less than those in the carbon A3, which has been heat-treated at 700° C.

Other Embodiments

When a porous carbon produced according to the present invention is used for an electrode, it is preferable that the micropore volume be greater while the functional group amount be smaller. The reason is that when the micropore volume is greater, the specific surface area is greater accordingly, and when the specific surface area is greater, the resulting battery capacity is greater accordingly. On the other hand, when the functional group amount is less, the gas formation during the battery use is reduced, and therefore, deterioration of the battery is inhibited. Herein, in order to increase the micropore volume, it is necessary to reduce the template size. However, when the template size is reduced, a problem arises that the amount of the functional groups increases. Nevertheless, by performing a heat treatment, it is possible to inhibit the micropore volume from decreasing while reducing the functional group amount. It should be noted that, when the porous carbon is used for an electrode, it is preferable that the micropore volume be 0.2 mL/g or greater and the specific surface area be 500 $m^2$/g, or greater; therefore, it is preferable to perform a heat treatment (1000° C. or lower). Therefore, among the above-described carbons A1 to A16, it is preferable to use carbon A4, which has a smaller template size and a less functional group amount (carbon A4 is a porous carbon that used magnesium citrate serving as both the carbon source and the template source and was heat-treated at 1000° C., and it has a micropore volume of greater than or equal to 0.2 mL/g and a specific surface area of greater than or equal to 500 $m^2$). In the case of magnesium citrate, it is unnecessary to prepare a mixture. Therefore, it is possible to reduce the number of manufacturing steps, resulting in a reduced cost.

When the porous carbon is used as a catalyst support, it is preferable that the porous carbon have a greater specific surface area and also have communicating pores composed of mesopores originating from the template. When the specific surface area is greater, the catalyst particles becomes finer microparticles, so the surface area of the catalyst becomes greater. As a result, the activity of the catalyst per mass becomes higher. Moreover, the communicating pores composed of mesopores originating from the template provide higher gas diffusion capability, so substances more easily move therein. As a result, the catalyst reaction occurs more efficiently, and the catalytic activity increases. Furthermore, when the porous carbon is used as a catalyst support, it is necessary to change the pore diameter of the porous carbon depending on the size of the catalyst, because the size of the catalyst ay vary. However, the pore size can be easily changed by changing the template size. Also, even when the functional group amount changes because of the change in the template size, the functional group amount may be adjusted to a desired amount by, for example, changing the type of the removing solution or changing the heat treatment temperature. Thus, the present invention can meet the requirements even when the size of the catalyst changes. When the porous carbon is used for a catalyst support, it is preferable that the specific surface area be 500 $m^2$/g or greater, more preferably 700 $m^2$/g or greater, and still more preferably from 800 $m^2$/g to 1200 $m^2$/g, and it is preferable that the template size be 3 nm to 30 nm in the current state. Depending on the application in which the catalyst support is used, there are cases in which durability and conductivity are considered important or cases in which the functional group amount is considered important. For the applications in which higher durability and higher conductivity are required, it is desirable to carry out a heat treatment (preferably 900° C. or higher, by performing a heat treatment at 900° C. or higher, crystallinity is improved, and durability and conductivity are accordingly improved), and it is preferable to use a porous carbon that has been heat-treated at 1000° C. and prepared using magnesium citrate, which serves as both the carbon source and the template source, or using a carbon source such as PVA and a template source such as a metal oxide (with a template size of 3 nm to 30 nm) (for example, the carbon A4 among the examples in the present application). For the applications in which the functional group amount is considered important, it is preferable to use magnesium citrate, which serves as both the carbon source and the template source, or use a carbon source such as PVA and a template source such as a metal oxide (with a template size of 3 nm to 30 nm), and it is preferable that the heat treatment either be not performed or be performed at 800° C. or lower. When the porous carbon is used as a catalyst support for a fuel cell, durability and electrical conductivity are considered important currently, and the catalyst in a size of 2 nm to 3 nm is used. For this reason, it is preferable to use a porous carbon that has been heat-treated (preferably at 900° C. or higher) and prepared using magnesium citrate, which has a template size that is closer to the size of the catalyst. Among the examples in the present application, it is preferable to use the carbon A4.

Furthermore, when the porous carbon is used as an enzyme electrode or an immobilized enzyme support for biosensors, it is necessary that the pore diameter of the mesopores be greater than or equal to 10 nm, preferably greater than or equal to 30 nm. However, when the template size is greater, the resulting amount of functional groups (the amount of hydrophilic functional groups) is smaller, which makes it difficult to immobilize the enzyme to the support. Nevertheless, the present invention makes it possible to increase the amount of functional groups by, for example, changing the removing solution or the ratio of the carbon source and the template. Taking these matters into consideration, it is preferable to use a porous carbon that has been produced with a template size of 30 nm to 150 nm and a greater proportion of the template in terms of the ratio of the carbon source and the template.

INDUSTRIAL APPLICABILITY

The present invention is applicable to, for example, adsorbent agents, catalyst supports for fuel cells and organic synthesis, and enzyme electrodes and immobilized enzyme supports for biosensors, as well as active materials and conductive additives in electrodes in batteries such as metal hydride batteries, air batteries, LiS batteries. NaS batteries, lithium-ion batteries, and lead-acid batteries.

REFERENCE SIGNS LIST

1—Pipe line
2—Gas supply port
3—Sample
4—Glass wool
5—Heating furnace
6—Gas discharge port

The invention claimed is:

1. A method of producing a porous carbon, comprising:
a first step of carbonizing a material containing a carbon source and a template source, to prepare a carbonized product; and a second step of immersing the carbonized product into a template removing solution, to remove a template from the carbonized product, the method characterized by:
controlling type, amount, or ratio of functional groups that are present in the porous carbon by changing at least two or more of the following conditions: type of the material, ratio of the carbon source to the template source, size of the template, and type of the template removal solution.

2. An electrode comprising a porous carbon produced by the method according to claim 1.

3. A catalyst support comprising a porous carbon produced by the method according to claim 1.

4. The method of producing a porous carbon, according to claim 1, wherein CO amount of the porous carbon measured using the TPD (Temperature Programmed Desorption) method is not greater than 3.114 mmol/g, and $CO_2$ amount of the porous carbon measured using the TPD method is not greater than 0.863 mmol/g.

5. A method of producing a porous carbon, comprising:
a first step of carbonizing a material containing a carbon source and a template source, to prepare a carbonized product; and a second step of immersing the carbonized product in a template removal solution, to remove a template from the carbonized product; wherein micropores are formed at positions facing mesopores, the method characterized by:
controlling type, amount, or ratio of functional groups that are present in the porous carbon by changing at least two or more of the following conditions: type of the material, ratio of the carbon source to the template source, and type of the template removal solution, wherein the volume of the micropores is greater than or equal to 0.2 mL/g.

6. The method of producing a porous carbon, according to claim 5, wherein CO amount of the porous carbon measured using the TPD (Temperature Programmed Desorption) method is not greater than 3.114 mmol/g, and $CO_2$ amount of the porous carbon measured using the TPD method is not greater than 0.863 mmol/g.

7. An electrode comprising a porous carbon produced by the method according to claim 5.

8. A catalyst support comprising a porous carbon produced by the method according to claim 5.

* * * * *